United States Patent
Renken et al.

(10) Patent No.: US 12,123,636 B2
(45) Date of Patent: *Oct. 22, 2024

(54) SYSTEMS AND METHODS FOR TRANSPORT CLIMATE CONTROL CIRCUIT MANAGEMENT AND ISOLATION

(71) Applicant: THERMO KING LLC, Minneapolis, MN (US)

(72) Inventors: David J. Renken, Prior Lake, MN (US); Tony Spetz, Afton, MN (US)

(73) Assignee: THERMO KING LLC, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,076

(22) Filed: Jun. 6, 2023

(65) Prior Publication Data
US 2023/0314055 A1 Oct. 5, 2023

Related U.S. Application Data

(63) Continuation of application No. 16/917,365, filed on Jun. 30, 2020, now Pat. No. 11,674,726.

(51) Int. Cl.
*F25B 49/02* (2006.01)
*F24F 11/36* (2018.01)
(Continued)

(52) U.S. Cl.
CPC ........... *F25B 49/005* (2013.01); *F24F 11/36* (2018.01); *F25B 45/00* (2013.01); *F25D 11/003* (2013.01);
(Continued)

(58) Field of Classification Search
CPC .... F25D 11/003; B60P 3/20; F25B 2500/222; F25B 2600/2513; F24F 11/36
See application file for complete search history.

(56) References Cited

U.S. PATENT DOCUMENTS 6,763,677 B1 7/2004 Burchill et al.
10,539,340 B2 1/2020 Senf, Jr. et al.
(Continued)

FOREIGN PATENT DOCUMENTS

EP 3051236 8/2016
EP 3358277 8/2018
(Continued)

OTHER PUBLICATIONS

Partial European Search Report, issued in the corresponding European patent application No. 21182194.7, dated Nov. 23, 2021, 12 pages.

*Primary Examiner* — Jonathan Bradford
(74) *Attorney, Agent, or Firm* — HSML P.C.

(57) ABSTRACT

A method of controlling a transport climate control system includes detecting for leaking of working fluid from a climate control circuit. The method also includes isolating a high-pressure side of the climate control circuit when leaking of the working fluid is detected. A method of controlling a transport climate control circuit includes detecting for overcharge and/or an undercharge of the climate control circuit. A transport climate control system includes a climate control circuit and a climate controller that is configured to detect for working fluid leaking from the climate control circuit. The climate controller configured to isolate a high-pressure side of the climate control circuit when leaking of the working fluid is detected.

18 Claims, 6 Drawing Sheets

(51) Int. Cl.
*F25B 45/00* (2006.01)
*F25B 49/00* (2006.01)
*F25D 11/00* (2006.01)

(52) U.S. Cl.
CPC . *F25B 2500/222* (2013.01); *F25B 2600/2513* (2013.01)

(56) References Cited

U.S. PATENT DOCUMENTS

| | | |
|---|---|---|
| 2010/0089076 A1 | 4/2010 | Schuster et al. |
| 2010/0229577 A1 | 9/2010 | Hong et al. |
| 2014/0318164 A1 | 10/2014 | Hayakawa et al. |
| 2015/0007591 A1 | 1/2015 | Liu et al. |
| 2015/0192343 A1 | 7/2015 | Ueno et al. |
| 2018/0023835 A1 | 1/2018 | Ooura et al. |
| 2018/0327179 A1 | 11/2018 | Papas et al. |
| 2019/0170600 A1 | 6/2019 | Tice et al. |
| 2020/0088431 A1 | 3/2020 | Yamada et al. |
| 2021/0001689 A1 | 1/2021 | Kondrk et al. |

FOREIGN PATENT DOCUMENTS

| | | |
|---|---|---|
| WO | 2020/009776 | 1/2020 |
| WO | 2020/051314 | 3/2020 |
| WO | 2020/055633 | 3/2020 |
| WO | 2020/067654 | 4/2020 |
| WO | 2020/236480 | 11/2020 |
| WO | 2021/046107 | 3/2021 |

SYSTEMS AND METHODS FOR TRANSPORT CLIMATE CONTROL CIRCUIT MANAGEMENT AND ISOLATION

FIELD

This disclosure generally relates to transport climate control systems. More specifically, this disclosure relates to detecting and minimizing leakage from a climate control circuit of a transport climate control system and/or mitigating overcharge or undercharge of the climate control circuit.

BACKGROUND

A transport climate control system is generally used to control environmental condition(s) (e.g., temperature, humidity, air quality, and the like) within a climate controlled space of a transport unit (e.g., a truck, trailer, a container (such as a container on a flat car, an intermodal container, etc.), a box car, a semi-tractor, a bus, or other similar transport unit). The transport climate control system can include, for example, a transport refrigeration system (TRS) and/or a heating, ventilation and air conditioning (HVAC) system. The TRS can control environmental condition(s) within the climate controlled space to maintain cargo (e.g., produce, frozen foods, pharmaceuticals, etc.). The HVAC system can control environmental conditions(s) within the climate controlled space to provide passenger comfort for passengers travelling in the transport unit. In some transport units, the transport climate control system can be installed externally (e.g., on a rooftop of the transport unit, under the transport unit, on a front wall of the transport unit, etc.).

The transport climate control system can include a climate control circuit with a compressor, a condenser, an expansion valve, and an evaporator. A working fluid can include a refrigerant that can be compressed and expanded as it flows through the climate control circuit and can be used to heat and/or cool the particular space.

SUMMARY

The embodiments described herein are generally directed to detecting and minimizing leakage from a climate control circuit in a transport climate control system ("TCCS") and/or mitigating overcharge or undercharge of the climate control circuit.

Transport units can have a climate controlled space for cargo or passengers that is provided climate control (e.g., heated, cooled, etc.) by a climate control circuit of a transport climate control system. The climate control circuit can utilize a working fluid. The working fluid can include a flammable refrigerant. In some instances, the flammable refrigerant can leak from the climate control circuit into the climate controlled space. The climate control circuit can contain an amount of refrigerant that is sufficient to make the climate controlled space flammable. Minimization of the amount of leakage from the climate controlled circuit may be desirable to prevent the climate controlled space from becoming a flammable environment.

Disclosed embodiments are capable of operating a TCCS to minimize potential leakage of the working fluid into a climate controlled space. Disclosed embodiments can isolate a high-pressure side of the climate control circuit to mitigate the potential of working fluid leaking into the climate controlled space. The disclosed embodiments can, for example, close an electronic expansion and isolation valve (EEIV) and shutdown a compressor to isolate the high-pressure side. Some disclosed embodiments can detect an overcharge or undercharge of the climate controlled circuit based on the performance of the EEIV.

In an embodiment, a method is directed to controlling a TCCS for a transport unit. The TCCS includes a climate control circuit with a compressor and an electronic expansion and isolation valve (EEIV). The method includes operating the climate control circuit to condition a climate controlled space of the transport unit. Operating the climate control circuit to condition the climate controlled space includes compressing a working fluid with the compressor and expanding the working fluid with the EEIV. The method also includes detecting for leaking of the working fluid from the climate control circuit and isolating the high-pressure side of the climate control circuit when detected that the working fluid is leaking from the climate control circuit.

In an embodiment, the method also includes isolating a portion of the low-pressure side of the climate control circuit when the leaking of the working fluid is detected. In an embodiment, the climate control circuit includes an evaporator that heats the working fluid. The portion of the low-pressure side extends through an evaporator unit that contains the evaporator.

In an embodiment, the climate control circuit includes an isolation valve that is downstream of the evaporator and upstream of the compressor in the climate control circuit. The portion of the low-pressure side of the climate controlled circuit is isolated by at least closing an isolation valve.

In an embodiment, the isolating of the high-pressure side of the climate control circuit isolates the high-pressure side from the low-pressure side of the climate control circuit.

In an embodiment, isolating the high-pressure side of the climate control circuit includes closing the EEIV and shutting down the compressor.

In an embodiment, the method includes detecting, via a step position sensor, a step position of a stepper motor of the EEIV, and detecting at least one step position of the EEIV and one or more other operational parameters of the climate control circuit. The method also includes comparing operation of the EEIV to an expected operation of the EEIV, the expected operation of the EEIV being operation of the EEIV expected from the detected at least one step position of the EEIV and the detected one or more other operational parameters of the climate control circuit.

In an embodiment, the method includes determining a subcooling of the compressed working fluid. The subcooling is determined based on a detected pressure and temperature of the compressed working fluid position of the EEIV. The method determines that the climate control circuit is overcharged when the subcooling is greater than a predetermined threshold.

In an embodiment, the climate control circuit includes an electronic check valve that is downstream of the evaporator and upstream of the compressor in the climate control circuit. The method includes determining a location of a leak in the climate control circuit based on a valve positon of an electronic check valve.

In an embodiment, a method is directed to controlling a TCCS for a transport unit. The TCCS includes a climate control circuit with a compressor to compress a working fluid and an electronic expansion and isolation valve (EEIV) to expand the working fluid. The method includes detecting for overcharge of the climate controlled circuit.

The method includes a subcooling of the compressed working fluid. The subcooling is determined based on a detected pressure and temperature of the compressed working fluid. The method determines that the climate control circuit is overcharged when the subcooling is greater than a predetermined threshold.

In an embodiment, the detected temperature of the compressed working fluid is detected via a temperature sensor of the EEIV.

In an embodiment, a TCCS for a transport unit includes a climate control circuit and a climate controller. The climate control circuit includes a compressor, a condenser, an EEIV, and an evaporator for a working fluid. The compressor compresses the working fluid, the condenser cools the compressed working fluid, the EEIV expands the cooled working fluid, and the evaporator heats the expanded working fluid.

The climate controller detects for leaking of the working fluid from the climate control circuit. The climate controller isolates a high-pressure side of the climate control circuit when leaking of the working fluid is detected.

In an embodiment, the climate controller at least closes the EEIV and shuts down the compressor to isolate the high-pressure side of the climate control circuit.

In an embodiment, the EEIV includes a stepper motor and a step position sensor. The step position sensor is for detecting a step position of the stepper motor. The climate controller detects, via the step position sensor, the step position of the stepper motor. The climate controller compares operation of the EEIV to an expected operation of the EEIV to determine whether working fluid is leaking. The expected operation of the EEIV being operation of the EEIV expected from at least one detected step position and one or more other detected operational parameters of the climate control circuit.

In an embodiment, the climate control circuit includes an isolation valve downstream of the evaporator and upstream of the compressor. When leaking of the working fluid is detected, the climate controller isolates a portion of a low-pressure side of the compressor by closing the isolation valve.

In an embodiment, the climate control circuit includes an electronic check valve with a proximity sensor. The climate controller detects, via the proximity sensor, a valve position of the electronic check valve. The climate controller also determines a location of a leak in the climate control circuit based on the detected valve position of the electronic check valve.

BRIEF DESCRIPTION OF THE DRAWINGS

Both described and other features, aspects, and advantages of transport climate control systems and methods of controlling a transport climate control system will be better understood with the following drawings.

Like reference characters refer to similar features.

DETAILED DESCRIPTION

Figure 1:
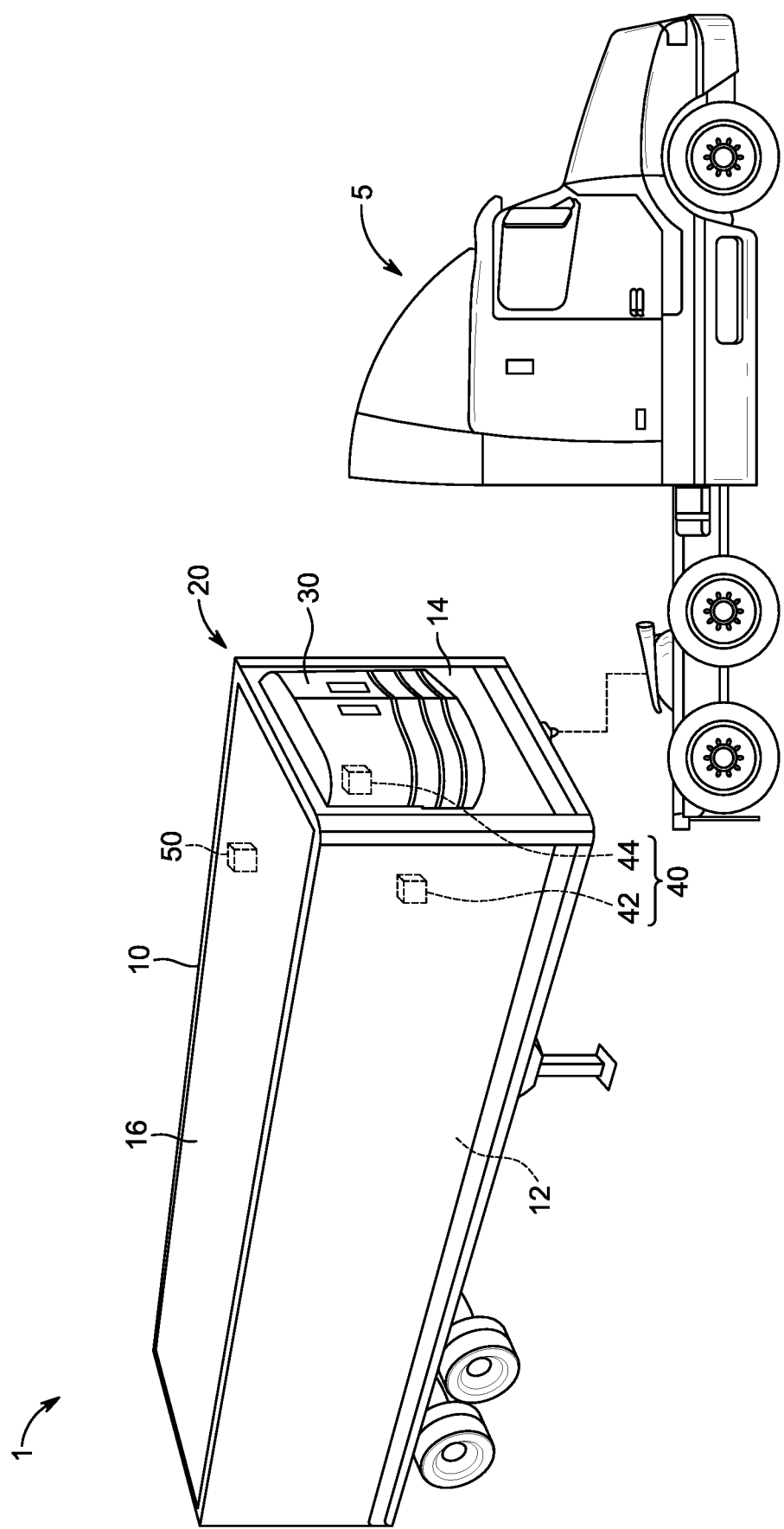
FIG. 1 is a prospective view of an embodiment of a climate controlled transport unit attached to a tractor.

The embodiments described herein are generally directed to detecting and minimizing leakage from a climate control circuit in a transport climate control system ("TCCS") and/or detecting overcharging or undercharging of the climate control circuit.

In the following detailed description, reference is made to the accompanying drawings, which illustrate embodiments in which the invention may be practiced. These embodiments are described in sufficient detail to enable those skilled in the art to practice what is claimed, and it is to be understood that other embodiments may be utilized without departing form the spirit and the scope of the claims. The following detailed description and the accompanying drawings, therefore, are not to be taken in a finite sense.

Different types of goods/cargo may need to be stored at specific environmental condition(s) while being stored within a transport unit. For example, perishable goods may need to be stored within a specific temperature range to prevent spoilage and liquid goods may need to be kept at a temperature above their freezing point. Also, goods having electronic components may need to be kept in environmental conditions with a lower moisture content to avoid damage to their electronic components. Passengers traveling in the transport unit may need to be kept in a climate controlled space with specific environmental condition(s) to ensure their comfort while traveling. For example, the climate controlled space containing the passengers should be at a temperature that is generally comfortable for passengers. A transport climate control system may blow conditioned air into the climate controlled space of the transport unit to keep the air within the climate controlled space at the desired environmental conditions.

ASHRAE Standard 34 (e.g., ASHRAE 34-2019) provides guidelines for determining the safety classification of a refrigerant or a refrigerant blend. Generally nonflammable refrigerants or blends are classified as Class 1, while highly flammable refrigerants or blends are classified as Class 3. Lower toxicity refrigerants or blends are classified "A", while higher toxicity refrigerants or blends are classified "B". Previously, many A1 refrigerants (e.g., R22, R134a, R410A, R125A, etc.) have been used due to generally being safe and providing good performance. Presently, most to all of the A1 refrigerants currently being used have been found to have a high global warming potential ("GWP") and therefore significantly contribute to global warming when leaked into the environment. A variety of refrigerant and refrigerant blends (e.g., R32, R1234yf, R1234ze(E), etc.) have a lower GWP while providing performance (e.g., capacity, temperature glide, operating pressures, etc.) comparable to current A1 refrigerants. However, many of these comparable refrigerants/refrigerant blends are mildly flammable (e.g., classified as A2L) and therefore have been avoided due the dangerous flammable environment they can create when leaked into an enclosed space.

The embodiments described herein are generally directed to detecting and minimizing leakage from a climate control circuit in a TCCS, and/or detecting overcharging or overcharging of the climate control circuit. The climate control circuit includes a compressor for compressing a working fluid and a EEIV for expanding the working fluid. The working fluid including a flammable refrigerant. The climate controlled circuit is configured to providing conditioning (e.g., heating, cooling, etc.) to a climate controlled space. The TCCS includes a climate controller for controlling the climate control circuit. For example, the climate controller is configured to isolate the high-pressure side of the climate control circuit when leaking of working fluid is detected. This can advantageously limit the flow of working fluid within the climate control circuit such that the amount of refrigerant that can leak into a climate controlled space is reduced/minimized.

FIG. 1 illustrates one embodiment of a climate controlled transport unit 1 attached to a tractor 5. The climate controlled transport unit 1 includes a transport unit 10 and a transport climate control system ("TCCS") 20 for the transport unit 10. Dashed lines are used in FIG. 1 to illustrate features that would not be visible in the view shown. The transport unit 10 may be attached to the tractor 5 that is configured to tow the transport unit 10 to and from different locations. When not being transported, the transport unit 10 may be parked and unattached from the tractor 5. It will be appreciated that the embodiments described herein are not limited to tractor and trailer units, but can apply to any type of transport unit such as a container (e.g., a container on a flat car, an intermodal container, etc.), a truck, a box car, a commercial passenger vehicle (e.g., school bus, railway car, subway car, etc.), or other similar transport unit.

The TCCS 20 includes a climate control unit ("CCU") 30 that provides environmental control (e.g. temperature, humidity, air quality, etc.) within a climate controlled space 12 of the transport unit 10. The climate controlled space 12 is an internal space of the transport unit 10. The CCU 30 provides conditioned air into the climate controlled space 12 of the transport unit 10 to provide a desired conditioned environment for the goods being held within the climate controlled space 12 of the transport unit 10. The desired conditioned environment for the climate controlled space 12 can have one or more desired environmental conditions (e.g., temperature, humidity, air quality, etc.). For example, the CCU 30 may provide cooled air to the climate controlled space 12 when perishable goods are being kept within the transport unit 10. In another example, the CCU 30 may dehumidify the air within the climate controlled space 12 of the transport unit 10 when electronics are within the transport unit 10. The CCU 30 includes a climate control circuit (e.g., see FIG. 2, see FIG. 3, etc.) for providing conditioned air to the climate controlled space 12.

The CCU 30 is disposed on a front wall 14 of the transport unit 10. In other embodiments, it will be appreciated that the CCU 30 can be disposed, for example, on a roof 14 or another wall of the transport unit 10. The climate controlled transport unit 1 can include a battery (not shown), an internal combustion engine (not shown), or a both as a power source. The TCCS 20 may be a hybrid power system that uses a combination of battery power and engine power or an electric power system that does not include or rely upon an internal combustion engine of the TCCS 20 or the tractor 5 for power.

The TCCS 20 also includes a programmable climate controller 40 and one or more sensors 50. The sensor(s) 50 are configured to measure one or more parameters of the climate controlled transport unit 1 (e.g., an ambient temperature and/or ambient humidity outside of the transport unit 10, a compressor suction pressure, a compressor discharge pressure, a temperature of air supplied into the climate controlled space 12 by the CCU 30, a temperature of air returning from the climate controlled space 12 to the CCU 30, a humidity within the climate controlled space 12, etc.) and communicate parameter data to the climate controller 40. The climate controller 40 is configured to control operation of the TCCS 20 including components of the climate control circuit. The climate controller 40 may be a single integrated control unit 42 or a control unit formed by a distributed network of climate controller elements 42, 44. The number of distributed control elements in a given network can depend upon the particular application of the principles described herein.

Figure 2:
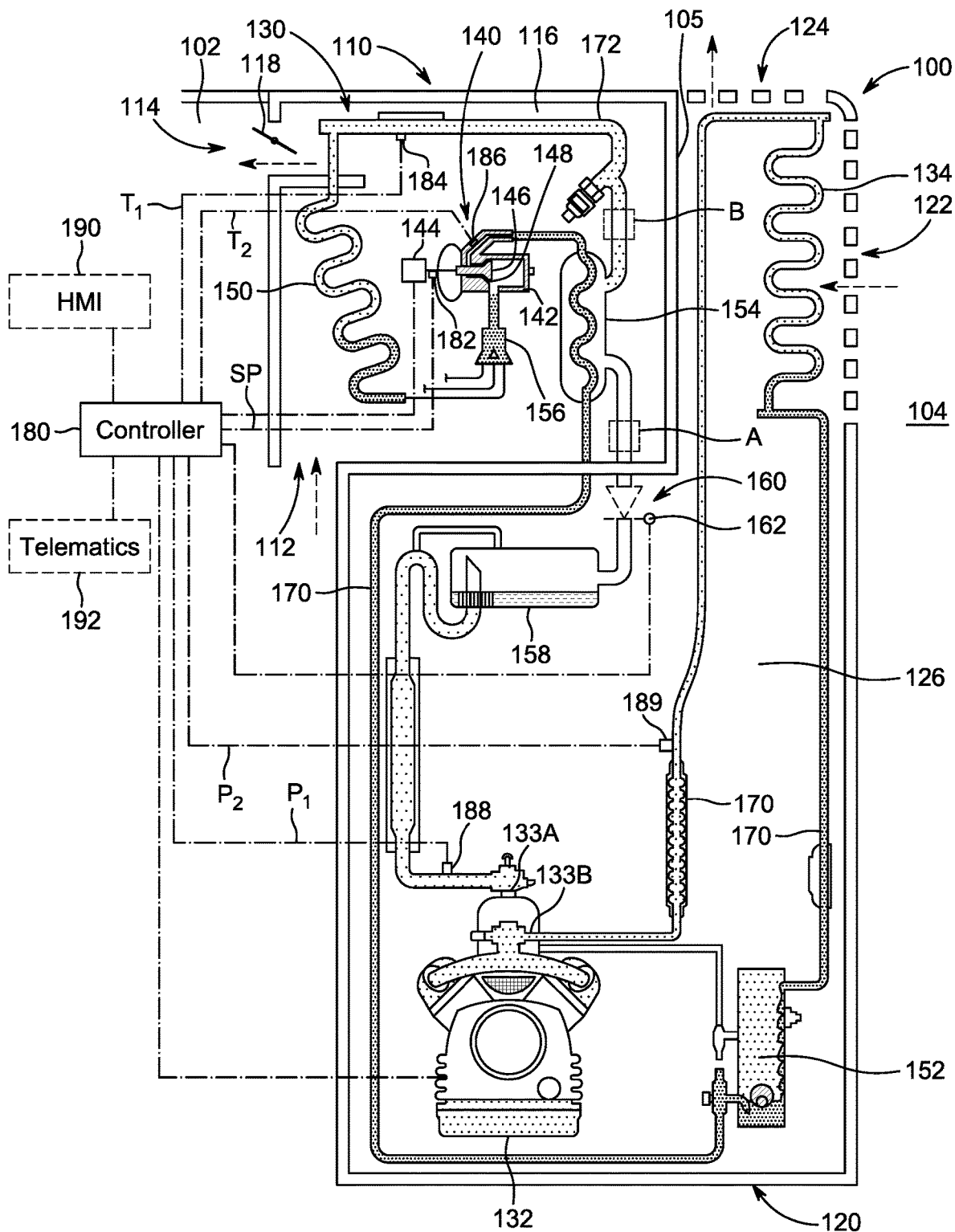
FIG. 2 is a schematic diagram of a climate control unit for a transport climate controlled system, according to one embodiment.

FIG. 2 is a schematic diagram of an embodiment of a CCU 100. The CCU 100 can be utilized in a TCCS (e.g., the TCCS 10 in FIG. 1, etc.) to condition a climate controlled space 102. The CCU 100 includes a climate control circuit 130 that is utilized to control environmental condition(s) (e.g., temperature, humidity, air quality, etc.) of the climate controlled space 102. In an embodiment, the climate controlled space 102 is the climate controlled space of a transport unit (e.g., climate controlled space 12 of transport unit 10 in FIG. 1, etc.). The CCU 100 includes an evaporator unit 110 and a condenser unit 120.

The evaporator unit 110 includes an evaporator air inlet 112, an evaporator air outlet 114, and an internal volume 116. Air passes through the evaporator unit 110 by entering through the evaporator air inlet 112 and exiting through the evaporator air outlet 114. In particular, air from the climate controlled space 102 enters the evaporator unit 110 through the air inlet 112, the air is conditioned within the evaporator unit 110 (e.g., heated, cooled, etc.), and the conditioned air is discharged from the evaporator unit 110 through the evaporator air outlet 114. The conditioned air flows from the evaporator air outlet 114 to the climate controlled space 102 and conditions the climate controlled space 102. The evaporator air inlet 112 can also be referred to as an air return inlet, and the evaporator air outlet 114 can also be referred to as a conditioned air outlet.

The condenser unit 120 includes an ambient air inlet 122, an ambient air outlet 124, and an internal volume 126. Ambient air from the external environment 104 (e.g., ambient air from outside the climate controlled transport unit 1 in FIG. 1, etc.) flows through the condenser unit 120 by entering through its ambient air inlet 122 and exiting through its ambient air outlet 124.

In FIG. 2, the evaporator unit 110 includes a damper 118 that regulates the flow rate of the conditioned air from the evaporator unit 110. It will be appreciated that the evaporator unit 110 and the condenser unit 120 in various embodiments may each include one or more fan(s) and/or damper(s) to control the flow of respective air therethrough. For example, the evaporator unit 110 can include one or more evaporator blowers (not shown) that discharges conditioned air through the evaporator air outlet 114 and/or retrieves air from the climate controlled space 104 through the evaporator air inlet 112. For example, the condenser unit 120 can include one or more condenser fans (not shown) that pushes air out of the condenser unit 120 through the ambient air outlet 124.

The internal volume 116 of the evaporator unit 110 is separate from the internal volume 126 of the condenser unit 120. For example, the CCU 100 can include a bulkhead 105 that separates the internal volume 116 of the evaporator unit 110 from the internal volume 126 of the condenser unit 120. Accordingly, air and/or leaked refrigerant within the condenser unit 120 generally cannot flow into the evaporator unit 110 and therefore cannot flow into the conditioned space climate controlled space 102 (e.g., the internal volume 116 of the condenser unit 120 is not fluidly connected to the climate controlled space 102).

As shown in FIG. 2, the climate control circuit 130 includes components that are located in the evaporator unit 110 and components that are located in the condenser unit 120, as discussed in more detail below. The climate control circuit 130 extends through the bulkhead 105. The pipes, hoses, etc. of the climate control circuit 130 extend through the bulkhead 105 to pass the working fluid between the components of climate control circuit 130 in the evaporator unit 110 and the components of the component of the climate control circuit 130 in the condenser unit 120.

The climate control circuit 130 includes a compressor 132, a condenser 134, an electronic expansion and isolation valve (EEIV) 140, and an evaporator 150. As shown in FIG. 2, the climate control circuit 130 can also include a receiver tank 152, an economizer 154, a distributor 156, and an accumulator tank 158. In an embodiment, the climate control circuit 130 can be modified to include additional components, such as, for example, one or more additional valve(s), sensor(s), an overflow tank, a filter drier, or the like.

Operation of the climate control circuit 130 is controlled by a programmable climate controller 180. The climate controller 180 is configured to detect various operating parameters of the climate control circuit 130. For example, the climate controller uses one or more sensor(s) (e.g.; sensors 50 in FIG. 1; proximity sensor 162, step position sensor 182, temperature sensor 184, temperature sensor 186, etc.) for detecting one or more operating parameters of the climate control circuit 130. In an embodiment, the climate controller 180 is a climate controller of a transport climate controller system (e.g., the climate controller 40 of the TCCS 20 in FIG. 1). In an embodiment, the climate controller 180 includes a memory (not shown) for storing information and a processor (not shown). The climate controller 180 is configured to control operation of the CCU 100 and its components. The climate controller 180 is shown in FIG. 2 as a single integrated control unit. However, it will be appreciated that the climate controller 180 in an embodiment may a single integrated control unit or a distributed network of climate controller elements (e.g., distributed network of climate controller elements 42, 44 in FIG. 1, etc.).

The components of the climate control circuit 130 are fluidly connected. Dashed lines are provided in FIGS. 2-6 to indicate optional features or locations. Dashed dotted lines are provided in FIGS. 2 and 3 to illustrate electronic communications between different components. For example, a dashed dotted line extends from the climate controller 180 to the compressor 132 as the climate controller 180 is configured to control the compressor 132. Dotted arrows are provided in FIGS. 2 and 3 to indicate flows of air into and out of the evaporator unit 110 and the condenser unit 120.

A working fluid flows through climate control circuit 130. The working fluid can include one more flammable refrigerants. In an embodiment, the refrigerant of the working fluid includes one or more refrigerants that classify as A2L. For example, the refrigerant can be a single refrigerant or a refrigerant blend (e.g., a combination of two or more refrigerants) that classifies as A2L refrigerant. For example, the working fluid can include one or more of, but is not limited to, R32, R1234yf, R1234ze(E), and R454C. It should be noted that a working fluid can also include non-refrigerant components. For example, non-refrigerant components can be, but not limited to, lubricants, impurities, refrigeration system additives, tracers, ultraviolet dyes, and solubilizing agents. In general, these additional components are present in small concentrations relative to the refrigerant(s) in the working fluid.

In an embodiment, the climate control circuit 130 is configured to operate in a cooling mode to provide conditioned air (e.g., cooled air) to the ambient space 102. Flow of the working fluid through the climate control circuit 130 in the cooling mode when operating normally (e.g., working fluid is not leaking, etc.) is described below. Generally, the main flow path in the climate control circuit 130 for the working fluid is from the compressor 132 to the condenser 134, from the condenser 134 to the EEIV 140, from the EEIV 140 to the evaporator 150, and from the evaporator 150 to back to the compressor 132.

Beginning at the compressor 132, the compressor 132 includes a suction port 133A and a discharge port 133B. Working fluid in a lower pressure gaseous state or mostly gaseous state is suctioned into the compressor 132 via its suction port 133A. The working fluid is compressed as it flows through the compressor 132. Compressed working fluid is discharged from the compressor 132 via its discharge port 133B and flows to the condenser 134. The lower pressure working fluid flows into the suction port 133A of the compressor 132 and the compressed higher pressure working fluid flows out from the discharge port 133B of the compressor 132.

The compressor 132 is a multispeed compressor. In other embodiments, the compressor 132 may be a single speed compressor. The compressor 132 can be driven by a prime mover (not shown). For example, the prime mover may be an internal combustion engine, an electrical drive motor, or a combination thereof. In some embodiments, the CCU 100 can include a combination of an internal combustion engine and an electric drive motor and can be configured to use the internal combustion engine alone or the electric drive motor alone. In some embodiments, the CCU 100 can include a combination of an internal combustion engine and an electric drive motor and can be configured to use a combination thereof (e.g., both operating at the about the same time to power the various components of the CCU 100, etc.). In some embodiments, the CCU 100 may be an electrically powered system that relies upon one or more batteries that are recharged using a local power source (e.g., an internal combustion engine of the CCU 100, an internal combustion engine of a tractor, etc.) and/or utility power.

The condenser 134 cools the compressed working fluid as it passes through the condenser 134. As indicated by the dotted arrows in FIG. 2, ambient air passes through the condenser unit 120 via its ambient air inlet 122 and its ambient air outlet 124. The ambient air flows through the condenser 134 as it flows through the condenser unit 120. The condenser 134 is a heat exchanger that allows the working fluid and the ambient air to be in a heat transfer relationship without physically mixing as they each flow through the condenser 134. As the working fluid flows through the condenser 134, the ambient air absorbs heat from the working fluid and cools the working fluid. The working fluid is cooled by the condenser 134 and becomes liquid or mostly liquid as it passes through the condenser 134. In some embodiments, ambient air may not be used to directly cool the working fluid. For example, the ambient air may be used to cool an intermediate heat transfer fluid (e.g., a solution including water, glycol, etc.), and the cooled intermediate heat transfer fluid passes through the condenser 134 to the cool the working fluid.

The working fluid flows from the condenser 134 to the EEIV 140. As shown in FIG. 2, the liquid working fluid in this embodiment flows from the condenser 134 to the EEIV 140 by passing through the receiver tank 152 and an economizer 154. The condenser 134 and the receiver tank 152 located in the condenser unit 120, while the EEIV 140 and the economizer 154 are located in the evaporator unit 110. The working fluid passing from the condenser unit 120 to the evaporator unit 110 as it flows from the condenser 134 to the EEIV 140.

The EEIV 140 expands the cooled working fluid from the condenser 134. The EEIV 140 allows the working fluid to expand as it flows through the EEIV 140. The expansion causes the working fluid to decrease in temperature. For example, the expansion by the EEIV 140 drops the pressure of the working fluid by at or about 90% or greater than 90%. The expanded working fluid is in a two-phase gaseous/liquid phase. The expanded gaseous/liquid working fluid flows from the EEIV 140 to the evaporator 150 via the distributor 156. The distributor 156 distributes the expanded working fluid into the evaporator 150.

The EEIV 140 includes a valve housing 142 and a stepper motor 144. The EEIV 140 is configured to be opened to various degrees (e.g., fully open, 75% open, 50% open, 25% open, etc.) and to be closed (e.g., has a closed position configured to entirely block the flow of working fluid through the EEIV 140). The EEIV 140 is adjustable to different degrees of open to change the flow rate of the working fluid through the EEIV 140. As discussed herein, it should be understood that "closed" means a valve is fully closed, and that "open" means the valve is in valve position other than fully closed (e.g., a fully open valve position, a 75% open valve position, in a 50% open valve position, in a 25% open valve position, etc.). The EEIV 140 is operated (e.g., adjusted to a specific valve positon) using the stepper motor 144. The stepper motor 144 controls the valve position of the EEIV 140. In an embodiment, the stepper motor 144 is coupled to a valve body 146 of the EEIV 140 and moves the valve body 146 relative to an orifice 148 of the EEIV 140. For example, the EEIV 140 is closed by the stepper motor 144 moving the valve body 146 to a closed position that seals the orifice 148.

During normal operation (e.g., when providing conditioning and no leakage of working fluid leak is detected), the climate controller 180 controls the stepper motor 144 to adjust the flowrate through the EEIV 140. The number of steps for the stepper motor 144 may vary based on the configuration of climate controlled transport unit in a particular embodiment (e.g., the configuration of the CCU 100, the climate control circuit 130, and/or the climate controlled space 102). The stepper motor 144 can have a number of steps that allows the stepper motor 144 to quickly close the EEIV 140 while still allowing precise control of the flow through EEIV 140 for precise control of the conditioning of the climate controlled space 102. The stepper motor 144 may be configured to have, for example, 800 steps. For example, the first step (e.g., step one) and the last step (e.g., step 800) can correspond to the EEIV 140 being closed and being fully open (e.g., 100% open), or vice-versa. In an embodiment, the stepper motor 144 can have a different number of steps than 800. The stepper motor 144 is also configured to be adjustable to each of its steps that are between its first step and its last step. The stepper motor 144 can allow the EEIV 140 to respond faster (e.g., close faster, open faster, etc.) than previous electronic expansion valves.

The EEIV 140 also includes a step position sensor 182 for the stepper motor 144. The step position sensor 182 can be used to detect the current step position SP of the stepper motor 144 (e.g., the current step of the stepper motor 144). The step positon SP of the stepper motor 144 can correspond with the valve position of the EEIV 140 as the movement of the stepper motor 144 changes the valve position of the EEIV 140. The climate controller 180 is configured to detect, via the step position sensor 182, the step position SP of the stepper motor 144. In an embodiment, the climate controller 180 uses the step position SP of the stepper motor 144 to detect the current valve position of the EEIV 140 (e.g., the degree that the EEIV 140 is open, if the EEIV 140 is closed), as the step position SP corresponds with the valve position of the EEIV 140. Operation of the EEIV 140 is discussed in more detail below.

An "electronic" expansion valve is an expansion valve that is driven by an electronic motor to adjust the degree that the valve is open (e.g., to vary the amount of working fluid flowing through the expansion valve). In contrast, a "mechanical" expansion valve is driven by a mechanical fluid system in which variation in the superheat of the working fluid automatically adjusts the degree that the valve is open (e.g., a temperature sensing bulb in which variation in working fluid temperature automatically adjusts the degree that the valve is open). An "isolation" valve is a valve configured to seal closed to block fluid therethrough (e.g., a closed position in which the valve's office is sealed shut). For example, the EEIV 140 is both i) an "electronic expansion" valve as the EEIV 140 is configured to be adjustable by its electronic stepper motor 144 and ii) an "isolation" valve as the EEIV 140 is configured to have a closed position in which the EEIV 140 is sealed closed (e.g., the closed position in which its valve body 146 seals the orifice 148, the EEIV 140 is 100% closed).

The evaporator 150 heats the working fluid as it passes through the evaporator 150. As shown in FIG. 2, the air to be conditioned (e.g., air from the climate controlled space 102) flows through the evaporator unit 110 physically separate from the working fluid via the evaporator air inlet 112 and the evaporator air outlet 114. The air passes through the evaporator 150 as it flows through the evaporator unit 110. The evaporator 150 is a heat exchanger that allows the working fluid and the air to be in a heat transfer relationship without physically mixing as they each flow through the evaporator 150. As the working fluid flows through the evaporator 150, the working fluid absorbs heat from the air and cools the air. The working fluid is heated by the evaporator 150 and becomes gaseous or mostly gaseous as it passes through the evaporator 150.

The heated working fluid flows from the evaporator 150 back to the compressor 132. As shown in FIG. 2, the gaseous/mostly gaseous working fluid in this embodiment flows from the evaporator 150 to the compressor 132 by passing through the economizer 154, an electronic check valve 160, and the accumulator tank 158. The evaporator 150 and the economizer 154 are located while the evaporator unit 110, while the compressor 132 and the accumulator tank 158 are located within the condenser unit 120. The working fluid passing from the evaporator unit 110 to the condenser unit 120 as it flows from the evaporator 150 to the compressor 132.

The compressor 132 receives lower pressure working fluid and discharges higher pressure compressed working fluid, while the EEIV 140 receives higher pressure working fluid and discharges expanded lower pressure working fluid. Accordingly, the climate control circuit 130 includes a high-pressure side 170 and a low-pressure side 172. The high-pressure side 170 is a portion of the climate control circuit 130 that extends from the discharge port 133B of the compressor 132 to the EEIV 140 and includes the condenser 134. The high-pressure side 170 receives the higher pressure compressed working fluid discharged by the compressor 132 and supplies it to the EEIV 140. The low-pressure side 172 is a portion of the climate control circuit 130 that extends from the EEIV 140 to the suction port 133A of the compressor 132 and includes the evaporator 150. The low-pressure side 172 receives lower pressure expanded working fluid from the EEIV 140 and supplies it to the compressor 132.

As shown in FIG. 2, the climate control circuit 130 also includes an electronic check valve 160 that is downstream of the evaporator 150 and upstream of the compressor 132. The working fluid passes through the electronic check valve 160 as it flows from the evaporator 150 to the compressor 132. The valve of the electronic check valve 160 is a conventional check valve that only allows the working fluid to flow through in a forward direction. The working fluid attempting to flow through the check valve in the reverse direction automatically moves its valve body into a closed position that seals the check valve and prevents working fluid from flowing through. The electronic check valve 160 automatically opens/closes based on fluid flow and is not driven by a motor, solenoid, etc. The electronic check valve 160 can prevent working fluid in the condenser unit 120 from flowing into the evaporator unit 110.

In FIG. 2, the electronic check valve 160 is located in the condenser unit 120. In other embodiments, the climate control circuit 130 may include the electronic check valve 160 in a different location after the evaporator 150 and before the compressor 132 than shown in FIG. 2. The electronic check valve 160 may be located in the evaporator unit 110. In an embodiment, the electronic check valve 160 may be located in the evaporator unit 110 downstream of the evaporator 150 and the economizer 154 and upstream of the compressor 132 (e.g., the location A in FIG. 2). In an embodiment, the electronic check valve 160 may be located in the evaporator unit 110 downstream of the evaporator 150 and upstream of the economizer 154 and the compressor 132 (e.g., the location B in FIG. 2).

The electronic check valve 160 includes a proximity sensor 162. The proximity sensor 162 is used to detect a valve position of the electronic check valve 160 (e.g., whether the electronic check valve 160 is open or closed). The proximity sensor 162 is attached to the outside of the electronic check valve 162 (e.g., attached to the outside of a valve housing of the electronic check valve 160) or into the housing of the electronic check valve 162 without extending into the interior of the electronic check valve 162 (e.g., does not pass through the housing into passageway for the working fluid, does not require openings or holes that extend through the valve housing of the electronic check valve 160, etc.). The proximity sensor 162 avoids adding any openings/holes into the electronic check valve 160 that are potential leakage paths for the working fluid. In an embodiment, the proximity sensor 162 is a magnetic field sensor attached to the outside of the electronic check valve 160. The proximity sensor 162 measures a magnetic field of the electronic check valve 160, which is different between the open position and the closed position of the electronic check valve 160 (e.g., the closed position results in a first magnetic field and the closed position results in second magnetic that is different from the first magnetic field). For example, the positon of the gate (not shown) within the electronic check valve 160 affects the magnetic field measured by the proximity sensor 162. The climate controller 180 can be configured to detect, via the proximity sensor 162, whether the electronic check valve 160 is open or closed.

During normal operation, the climate controller 180 is configured to control the EEIV 140 so that the working fluid heated by the evaporator 150 (e.g., the working fluid after the evaporator 150 and before the compressor 132) has a desired amount of superheat. The superheat of a fluid is the difference between its current temperature and its dew point at its current pressure (e.g., $T(P_x)$superheat=$T(P_x)$Current−$T(P_x)$Saturation temperature). The desired amount of the superheat can vary based on the configuration of a particular CCU and/or a climate control circuit. For example, the predetermined amount of superheat can be selected to minimize superheat while ensuring the working fluid retains sufficient superheat when entering the compressor 132 (e.g., enough superheat to prevent significant condensation of the refrigerant in working fluid before or within the compressor 132). Generally, the efficiency of the CCU 100 decreases as the amount of superheat is increased while significant condensation of the refrigerant can damage the compressor 132.

The saturation temperature of the working fluid at operating pressure(s) of the climate control circuit 130 can be known from, for example, previous testing of the working fluid and/or its components (e.g., testing of its refrigerant(s), etc.). Therefore, the predetermined amount of superheat can correspond to a (predetermined) target temperature/temperature range for the heated working fluid (e.g., $T(P_x)$ Target=Tsuperheat+$T(P_x)$Saturation Temperature). For example, the target temperature or temperature range, the predetermined amount of superheat, and/or the saturation temperature(s) for the working fluid can be stored in the memory of the climate controller 180. The climate control 180 is configured to operate the climate control circuit 180 so that the working fluid after being heated by the evaporator 150 is at the target temperature or within the target temperature range.

In an embodiment, the pressures in the climate control circuit 130 vary based on its operation (e.g., the discharge pressure of a multispeed compressor can vary with its speed, etc.). To maintain the predetermined amount of superheat, the target temperature/temperature range can be determined based on a detected evaporator outlet pressure of the working fluid (e.g., the current pressure of the heated working fluid). The climate controller 180 can be configured to detect the pressure of the heated working fluid directly (e.g., with a pressure sensor) or indirectly (e.g., based on current speed of the compressor 132, based on current electrical power being provided to an electric motor for the compressor 132, based on a discharge pressure of the compressor 132, etc.). For example, the climate control circuit 130 can include a pressure sensor 188 that measures a pressure $P_1$ of the working fluid after passing through evaporator 150. The pressure sensor 188 is located downstream of the evaporator 150 and upstream of the compressor 132. As show in FIG. 2, the pressure sensor 188 is located at or near the inlet of the compressor 132 and measures a pressure $P_1$ at the suction inlet of the compressor 132. The pressure sensor 188 can also be referred to as a suction pressure sensor. In an embodiment, the pressure sensor 188 may be located closer to the outlet of the evaporator 150. For example, the pressure sensor 188 can be located at the outlet of the evaporator 150 or between the evaporator 150 and the economizer 154 in the climate control circuit 130.

The climate controller 180 can be configured to detect one or more of the evaporator inlet temperature, the evaporator outlet temperature (e.g., heated working fluid temperature $T_1$), compressor discharge pressure (e.g., compressed working fluid pressure $P_1$), evaporator pressure (e.g., heated working fluid pressure/suction pressure $P_1$), and the step position SP of the stepper motor 144. In an embodiment, the climate controller 180 can be configured to detect for leaking working fluid, an overcharge of the climate control circuit 130, and/or an undercharge of the climate controller circuit 130 based on one or more of these detected parameters of the climate control circuit 130.

As shown in FIG. 2, the climate control circuit 130 includes a temperature sensor 184 located after the evaporator 150 and before the compressor 132. The temperature sensor 184 can be used to detect a temperature $T_1$ of the working fluid after being heated by the evaporator 150. For example, the temperature sensor 184 can be configured to detect the temperature $T_1$ of the working fluid discharged from the evaporator 150. The climate controller 180 can detect the temperature $T_1$ of the heated working fluid using the temperature sensor 184. The climate controller 180 is configured to control the EEIV 140 so that the temperature $T_1$ of the heated working fluid is at the target temperature (or temperature range). As discussed above, the target temperature or temperature range can vary with the pressure of the heated working fluid. In an embodiment, the climate control circuit 130 is configured to detect a pressure of the heated working fluid indirectly (e.g., based on electrical current supplied to the compressor 132, discharge pressure of the compressor 132, etc.) or directly (e.g., via a pressure sensor).

A climate control circuit is configured to utilize a specific amount of working fluid (e.g., has a designed working fluid capacity). The capacity of a climate control circuit varies based on its particular configuration (e.g., the sizing of the components in the climate control circuit, etc.). An operator and/or technician may fill a climate control circuit with more working fluid than its designed capacity, which can be referred to as overcharging. An operator and/or technician may fill a climate control circuit with less working fluid than its designed capacity, which can be referred to as undercharging. As shown in FIG. 2, the EEIV 140 can include a temperature sensor 186. The temperature sensor 186 is on the high-pressure side 172 of the EEIV 140 (e.g., located before the orifice 148, etc.). The temperature sensor 186 measures a temperature $T_2$ of the unexpanded compressed working fluid in the EEIV 140. The temperature $T_2$ of the unexpanded working fluid is the temperature of the compressed working fluid after being discharged from the compressor 132 (e.g., after the discharge port 133B, etc.) and before being expanded by the EEIV 140 (e.g., before the orifice 148, etc.). For example, the temperature sensor 186 measures a temperature $T_2$ of the unexpanded working fluid within the EEIV 140. The climate controller 180 can detect the temperature $T_2$ of the unexpanded working fluid via the temperature sensor 186.

As shown in FIG. 2, the climate control circuit 130 can include a discharge pressure sensor 189 for measuring the pressure $P_2$ of the unexpanded working fluid. The discharge pressure 189 measures the pressure $P_2$ of the compressed working fluid in the high-pressure side 172 of the climate control circuit 130. The pressure $P_2$ of the unexpanded working fluid is the pressure of the compressed working fluid after being compressed by the compressor 132 and before being expanded by the EEIV 140. For example, the pressure sensor 189 is provided downstream of the compressor 132 and upstream of the EEIV 140 in the climate control circuit 130. The climate controller 180 can detect the pressure $P_2$ of the unexpanded working fluid via the pressure sensor 189.

In an embodiment, the climate controller 180 is configured to detect overcharging of the climate control circuit 130 based on subcooling of the compressed working fluid. Subcooling is the difference between the saturation temperature ($T_{SAT}$) and the actual temperature $T_2$ of the unexpanded working fluid (e.g., subcooling=$T_{SAT}-T_2$). As discussed above, the saturation temperature of a fluid is based on its pressure (e.g., $T_{SAT}$ is determined based on the detected pressure $P_2$). The climate controller 180 can determine the subcooling of the unexpanded working fluid based on the pressure $P_2$ and the temperature $T_2$ of the unexpanded working fluid. The climate controller 180 determines that the climate control circuit 130 is overcharged when the subcooling is greater than a predetermined threshold. In an embodiment, the subcooling is detected for the compressed working fluid after being compressed by the compressor and before being expanded by the EEIV.

In an embodiment, the climate controller 180 is configured to detect undercharging of the climate control circuit 130 based on operation of the EEIV 140. For example, the climate controller 180 may determine that the climate control circuit 130 is undercharged based on comparing an expected step position of the EEIV 140 to an actual step positon SP. An undercharge may be detected when the variance between the expected step positon and the actual step position for the EEIV 140 is greater than a predetermined threshold. For example, the climate controller 180 may determine that the climate control circuit 130 is undercharged based on comparing the temperature of the working fluid heated by the evaporator to an expected temperature of said working fluid. An undercharge may be detected when the variance between the expected temperature of and the actual temperature of the heated working fluid is greater than a predetermined threshold. Such comparisons are discussed in more detail below. In such embodiments, the climate controller 180 may determine that the climate control circuit 130 is undercharged (instead of leaking) based on whether a trend in the variance exceeds a predetermined limit.

As discussed above, leaking of the working fluid is potentially dangerous due to the flammability of its refrigerant. In particular, leaking of the refrigerant into the climate controlled space can be dangerous as it can cause the climate controlled space to become a flammable environment (e.g., an environment in which an ignition source causes flame propagation/an explosion). An ignition source (e.g., spark, flame, etc.) does not cause a propagating flame/explosion until a refrigerant concentration reaches its reaches a minimum concentration, which is known as a lower flammability limit.

The climate controller 180 is configured to isolate the high-pressure side 170 of the climate control circuit when the leaking of working fluid is detected. When working fluid is leaking from the climate control circuit 130, the climate controller 180 is configured to at least shutdown the compressor 132 and close the EEIV 140. The EEIV 140 is closed by the stepper motor 144 adjusting the EEIV 140 to its closed position. The compressor 132 when shutdown is configured to block working fluid from flowing through the compressor 132 (e.g., configured so that working fluid cannot flow through the shutdown compressor 132). The isolation is configured to block the working fluid in the high-pressure 170 side from flowing to the low-pressure side 172 by at least the closed EEIV 140 and the shutdown compressor 132. The isolation prevents the working fluid from flowing from the high-pressure side 170 to the low-pressure side 130 of the climate controller circuit 130. For example, if a leak occurs in the evaporator 150, the isolation limits the amount of refrigerant/working fluid that can leak through the evaporator 150 by preventing the working fluid in the high pressure side 170 from flowing to the evaporator 150. The isolation of the climate control circuit 130 helps limit the potential leakage of working fluid into the condenser unit 120, and therefore limits the amount of working fluid that can leak into the climate controlled space 102 and cause it to become a flammable environment.

In some embodiments, the climate control circuit 130 may have additional fluid connection(s) that fluidly connect the high-pressure side 170 and the low pressure side 170 (e.g., a hot gas bypass, etc.). In such an embodiment, isolating the high-pressure side 170 can include the climate controller 180 operating additional component(s) of the climate control circuit 130 (e.g., valves, etc.) in the additional fluid connection(s) to block each additional fluid connection. In an embodiment, the climate controller 180 can be configured to maintain the isolation of the high-pressure side (e.g., preventing a startup of the shutdown compressor 132, keeping the EEIV 140 closed, etc.) until receiving instructions that the leakage is repaired. An operator and/or technician may instruct the climate controller 180 that the leak is repaired via, for example, a HMI 190 and/or a telematics unit 192 connected to the climate controller 180.

In an embodiment, the climate controller 180 can also be configured to detect a location of a leak in the climate control circuit 130. After isolating the high-pressure side 170, the climate controller 180 detects a valve position of the electronic check valve 160 using the proximity sensor 162. If the electronic check valve 160 is open, the leak can be determined to be in the low-pressure side 172 of the climate circuit 130 downstream of the electronic check valve 160. For such a leak, the open electronic check valve 160 can allow working fluid in the low-pressure side 172 upstream of the electronic check valve 160 (e.g., working fluid within the evaporator 150, etc.) to flow and leak into the internal volume 126 of the condenser unit 120, where it can escape to and be safely dissipated into the external environment 104. If the electronic check valve 160 is closed, the leak can be either in the high-pressure side 170 of the climate control circuit 130 or between the EEIV 140 and the electronic check valve 160 (e.g., in the evaporator 150). For such a leak, the closed electronic check valve 160 prevents working fluid that is between the electronic check valve 160 and the compressor 132 (e.g., working fluid in the accumulator tank 158) from flowing and leaking into the condenser unit 120, where the leaked working fluid will flow into the climate controlled space 102.

As shown in FIG. 2, the climate controller 180 can be connected to the HMI 190 and the telematics unit 192. The HMI 190 allows the climate controller 130 to display a warning to an operator of the climate controlled transport unit (e.g., climate controlled transport unit 1) of the CCU 100. In an embodiment, the CCU 100 includes the HMI 190. In an embodiment, a vehicle for moving transport unit of the TCCS (e.g., the tractor 5 in FIG. 1, etc.) includes the HMI 190. The telematics unit 192 allows the climate controller 130 to wirelessly communicate a warning to a remote device (not shown) (e.g., a computer, a server, a server network, etc.). In an embodiment, the TCCS may include the telematics unit 192. In an embodiment, a vehicle for moving transport unit of the TCCS (e.g., tractor 5 in FIG. 1, etc.) includes the telematics unit 192.

Figure 3:
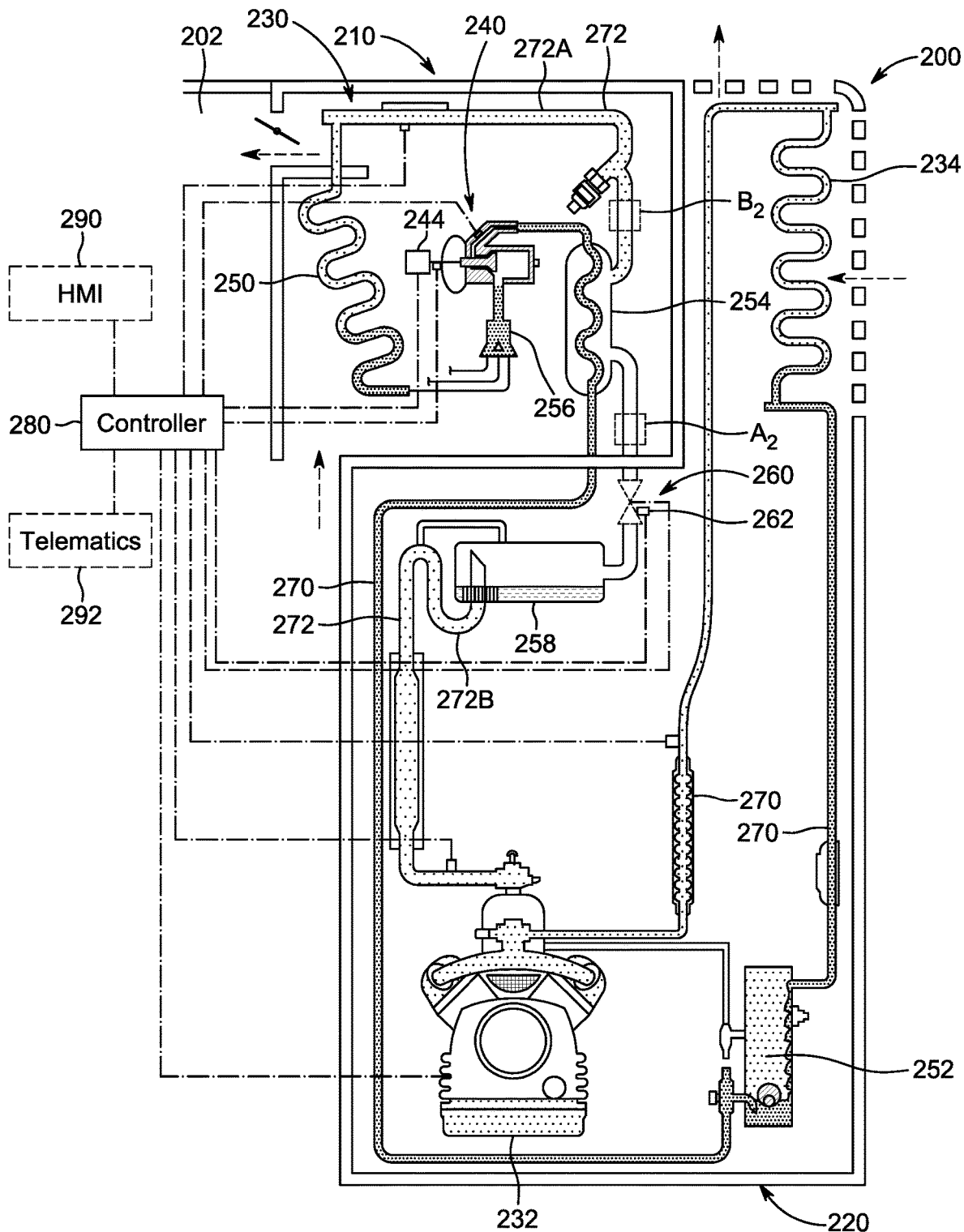
FIG. 3 is a schematic diagram of a climate control unit for a transport climate controlled system, according to another embodiment.

FIG. 3 is a schematic diagram of a CCU 200, according to another embodiment. The CCU 200 can be utilized in a transport climate control system (e.g., the transport climate control system 10 in FIG. 1, etc.) to condition a climate controlled space 202. The CCU 200 includes a climate control circuit 230 that can be utilized to control an environmental condition (e.g., temperature, humidity, air quality, etc.) of the climate controlled space 202. In an embodiment, the climate controlled space 202 is the climate controlled space of a transport unit (e.g., climate controlled space 12 of transport unit 10 in FIG. 1, etc.).

The CCU 200 in FIG. 3 has a similar configuration to the CCU 100 in FIG. 2, except for an isolation valve 260 being provided between the evaporator 250 and the compressor 232 instead of an electronic check valve. For example, the CCU 200 includes an evaporator unit 210, a condenser unit 220, and a climate control circuit 230 controlled by a climate controller 280. For example, the CCU 200 includes the compressor 232, a condenser 234, an EEIV 240 with a stepper motor 244, the evaporator 250, a receiver tank 252, an economizer 254, a distributor 256, and an accumulator tank 258. The climate controller 280 may also be connected to an HMI 290 and a telematics unit 292 similar to the climate controller 180. It will be appreciated that the CCU 200 in FIG. 3 in other embodiments may be modified in a similar manner as discussed above with respect to the CCU 100 in FIG. 2.

A working fluid flows through the climate controlled circuit 230 and is used to condition air supplied to the climate controlled space 202. In an embodiment, the working fluid includes flammable refrigerant as similarly discussed above for the working fluid of the climate control circuit 130 in FIG. 2. As similarly discussed above regarding the CCU 100 in FIG. 2, the climate controller 280 is configured to isolate the high-pressure side 270 of the climate control circuit 230 when it detects that working fluid is leaking.

As shown in FIG. 3, the climate control circuit includes the isolation valve 260 that is disposed downstream of the evaporator 250 and upstream of compressor 232 in the climate control circuit 230. The working fluid passes through the isolation valve 260 as it flows from the evaporator 250 to the compressor 232. In FIG. 3, the isolation valve 260 is provided in the condenser unit 220. In other embodiments, the climate control circuit 260 may include the isolation valve 260 in a different location downstream of the evaporator 250 and upstream of the compressor 232 than shown in FIG. 3. The isolation valve 260 may be located in the evaporator unit 210. In an embodiment, the isolation valve 260 may be located in the evaporator unit 210 downstream of the evaporator 250 and the economizer 256 and upstream the compressor 232 (e.g., location $A_2$ in FIG. 3, etc.). In an embodiment, the isolation valve 260 may be located in the evaporator unit 210 downstream of the evaporator 250 and upstream of the economizer 252 and the compressor 232 (e.g., location $B_2$ in FIG. 3, etc.).

The climate controller 280 controls the isolation valve 260. The isolation valve 260 has an open position and a closed position. In the closed position, the working fluid is blocked from flowing through the isolation valve 160. In an embodiment, the isolation valve 260 has an on/off configuration with two valve positions of fully open and closed. In contrast to a check valve that opens/closes automatically by the pressure of the working fluid, an isolation valve is activated by an external force. For example, the isolation valve 260 is activated by supplying air, hydraulics, electrical current, etc. to the isolation valve 260. The isolation valve 260 switches positions when activated (e.g., moves from its closed position to its open position, moves from its closed position to its open position). The isolation valve 260 can have a fail-close configuration in which the isolation valve 260 reverts to its closed position when not being activated. In an embodiment, the isolation valve 260 is a solenoid valve. For example, the climate controller 280 may supply electrical current to the isolation valve 260 to activate it.

In an embodiment, the isolation valve 260 includes a feedback sensor 262. The feedback sensor 262 is connected to the climate controller 260 and provides a confirmation regarding the operation of the isolation valve 260. The confirmation can be an electrical signal. The feedback sensor 262 is configured to send a confirmation that the isolation valve 260 is in its closed position. For example, the climate controller 130 switches the isolation valve 260 to its closed position when a leak is detected. Once the isolation valve 260 moves to its closed position, the feedback sensor 262 sends the confirmation to the climate controller 280. The feedback sensor 262 ensures that the isolation valve 260 closes correctly to block flow of working fluid.

The climate controller 280 is configured to isolate a portion 272A of the low-pressure side 272 of the climate circuit 230 when the working fluid is leaking. The portion 272A of the climate circuit 230 extends from the EEIV 240 to the isolation valve 260. The portion 272A of the climate control circuit 230 includes the evaporator 250. When working fluid leakage is detected, the climate controller 280 is configured to isolate the high-pressure side 270 and also close the isolation valve 260, which isolates the portion 272A of the low-pressure side 272 of the climate control circuit 230. For example, the closed EEIV 240 and the closed isolation valve 260 isolate the portion 272A of the low-pressure side 272 of the climate control circuit 230.

When a working fluid leak is detected, the climate controller 280 is configured to isolate the climate circuit 230 into at least three different sections: the high-pressure side 270, the first portion 272A of the low-pressure side 272, and a second portion 272B of the low-pressure side 272. The working fluid is prevented from flowing between the isolated sections. When a leak occurs in the climate control circuit 230, the isolation prevents working fluid in other sections from flowing into the section with the leak. For example, if a leak occurs in the first portion 272A of the low-pressure side 272 (e.g., in the evaporator 250, etc.), the isolation prevents the working fluid within the high-pressure side 270 and the working fluid within the second portion 272B of the low-pressure side 272 from flowing into the first portion 272 and through the leak into the evaporator unit 210 and then into the climate controlled space 202. The isolation of the climate control circuit 230 helps limit the potential leakage of working fluid into the condenser unit 210, and therefore limits the amount of working fluid that can leak into the climate controlled space 202 and cause it to become a flammable environment. The second portion 272B extends from the isolation valve 262 to the compressor 232. As shown in FIG. 3, the second portion 272B can include the accumulator tank 258.

Figure 4:
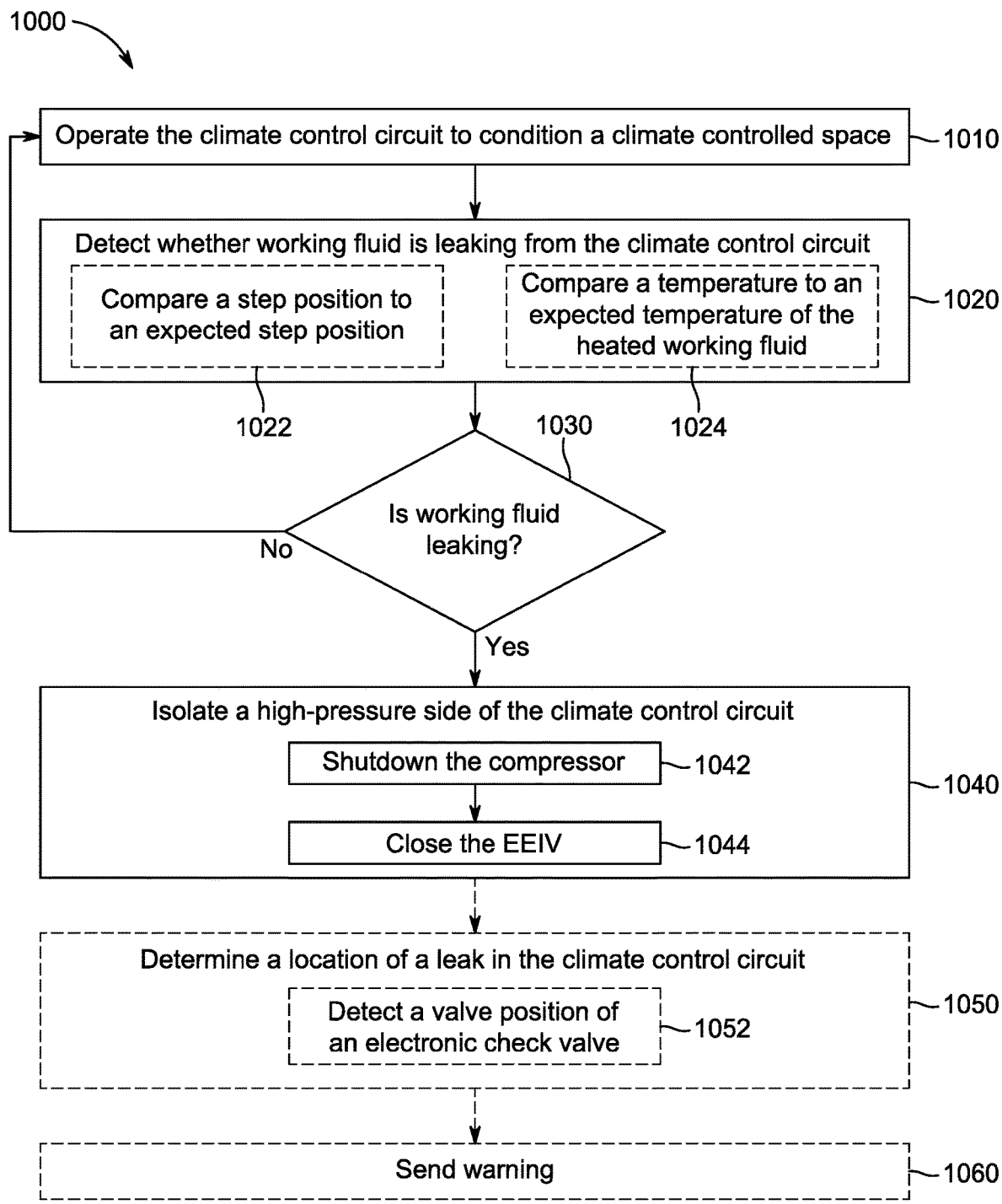
FIG. 4 is a flow chart of a method of controlling a transport climate control system, according to one embodiment.

FIG. 4 is a flow chart for a method 1000 of controlling a TCCS that includes a climate control circuit. In an embodiment, the method 1000 may be employed by the TCCS 20 in FIG. 1 and as described above. In an embodiment, the method 1000 may be employed by the climate controller 180 in FIG. 2 to control a TCCS including the CCU 100 in FIG. 2 and as described above. The method 1000 starts at 1010.

At 1010, the TCCS operates a climate control circuit (e.g., climate control circuit 130) to condition a climate controlled space (e.g., climate controlled space 12, climate controlled space 102). In an embodiment, the climate controlled space is the climate controlled space of a transport unit (e.g., climate controlled space 12 of transport unit 10 in FIG. 1). The climate control circuit includes a compressor (e.g., compressor 132), a condenser (e.g., condenser 134), an EEIV (e.g., EEIV 140), and an evaporator (e.g., evaporator 150). The compressor compresses the working fluid, the condenser cools the working fluid, the EEIV expands the working fluid, and the evaporator heats the working fluid. For example, the climate controlled circuit operates in a cooling mode to supply conditioned air (e.g., cooled air, etc.) to the climate controlled space. The method 1000 then proceeds to 1020.

At 1020, the climate controller of the TCCS (e.g., climate controller 180) detects whether working fluid is leaking from the climate control circuit. In an embodiment, the climate controller 1020 may detect that the working fluid is leaking based on one or more monitored parameters of the climate controlled transport unit (e.g., climate controlled transport unit 1). The climate controller 1020 may utilize one or more sensors (e.g., temperature sensor, pressure sensor, air quality sensor, etc.) to monitor said parameter(s).

In some embodiments, detecting whether the working fluid is leaking 1020 can include comparing actual operation of an EEIV to an expected operation of the EEIV based on one or more step position(s) of the EEIV. The EEIV can include a stepper motor (e.g., stepper motor 144) that adjusts the valve positon of the EEIV and a stepper position sensor (e.g., step position sensor 182). The climate controller can be configured to detect, via the step position sensor, the step position of the stepper motor.

As discussed above, the climate controller can be configured to adjust the EEIV based on a superheat of the working fluid (e.g., to adjust the EEIV so that the temperature $T_1$ is at a target temperature/range, etc.). For example, leaking refrigerant results in the climate circuit having a lesser amount of working fluid. The lessor amount of working fluid in the climate control circuit can result in the EEIV having to be open larger to allow more working fluid therethrough and maintain the same amount of cooling by the evaporator. Specific relationship(s) between the other operating parameters and the step position of the EEIV in the climate control circuit with no leaks can be determined based on previous testing (e.g., of the climate control circuit, of a climate control circuit with the same or similar configuration, etc.). The climate controller can use these relationship(s) based on the step position(s) of the EEIV to detect if the working fluid is leaking.

In an embodiment, detecting whether the working fluid is leaking 1020 can include the climate controller comparing the step position of the EEIV to an expected step position 1022. Comparing a step position to an expected step position 1022 can include the climate controller detecting operating conditions of climate control circuit, and comparing the step position(s) of the EEIV to expected step position(s) based on the operating conditions of the climate control circuit. For example, the climate controller is configured to detect step position(s) of EEIV (e.g., one or more step positions of the stepper motor of the EEIV) and temperature(s) of the working fluid (e.g., temperature $T_1$ of the heated working fluid, temperature $T_1$ of the working fluid over time, etc.) and pressure(s) of the working fluid (e.g., pressure $P_1$ of the working fluid, a discharge pressure of the compressor, pressure $P_1$ or discharge pressure of the compressor over time, etc.). In some embodiments, one or more of the operation conditions may have been detected in the operating of the climate control circuit at 1010.

An expected step position can be the step position expected based on the temperature of the working fluid and the pressure of the working fluid used for determining the superheat of the working fluid (e.g., temperature $T_1$, pressure $P_1$, an operation parameter for indirectly detecting the pressure, etc.). The climate controller can be configured to determine that the working fluid is leaking when the variance between the actual step position of the EEIV (e.g., a detected step position) and the expected step position exceeds a predetermined threshold (e.g., a predetermined step amount, a predetermined numbers of steps, etc.). In an embodiment, the climate controller may be configured to determine that the working fluid is leaking at 1022 when a trend of said variance exceeds a predetermined limit (e.g., change in the variance is increasing by greater than X steps per minute, etc.). For example, the climate controller is configured to periodically determine the variance between the actual step position of the EEIV and an expected step position, and then determines a trend in the variance over a predetermined period (e.g., trend of the variance determinations over the previous X minutes/hours, etc.). The climate controller can then determine that working fluid is leaking at 1022 when the trend of the variance in the step position of the EEIV exceeds the predetermined limit. This can also be referred to as drift. In some embodiments, the trend in variance can be useful for determining whether the heat transfer circuit is undercharged or is leaking.

In an embodiment, detecting whether the working fluid is leaking 1020 can include comparing the temperature of the working fluid heated by the evaporator to an expected temperature of said working fluid 1024. Comparing the temperature of heated working fluid to the expected temperature of the heated working fluid at 1024 can include detecting operating conditions of climate control circuit. For example, the climate controller is configured to detect a first step position of the EEIV, a second step positon of EEIV (e.g., the step position of the stepper motor of the EEIV), a first temperature of the heated working fluid (e.g., temperature $T_1$ of the heated working fluid at the first step positon), and a second temperature of the heated working fluid (e.g., temperature $T_1$ of the heated working fluid at the second step positon).

When the climate controller adjusts the EEIV to control the temperature of the heated working fluid (e.g., to control superheat, to control temperature $T_1$, etc.), the climate controller is configured to compare how the adjustment of the EEIV affects the temperature of the heated working fluid to how it would be expected to affect the said temperature. For example, the climate controller can determine that the adjustment of the EEIV (e.g., from a detected first step position to a detected second step position, etc.) can be expected to increase or decrease the heated working fluid by X degrees (e.g., increase or decrease its superheat by X degrees, increase or decrease the temperature $T_1$ by X degrees). This temperature change is the expected temperature of the heated working fluid.

In an embodiment, the climate controller at 1024 can be configured to determine that a leak has occurred based on variance between the actual temperature of the working fluid (e.g., detected temperature $T_1$) and the expected temperature of the working fluid. For example, when the variance is greater than a predetermined threshold (e.g., a predetermined temperature amount). In an embodiment, the climate controller may be configured to determine that the working fluid is leaking at 1024 when a trend of said variance exceeds a predetermined limit (e.g., change in the variance is increasing by greater than X degrees per minute, etc.). For example, the climate controller is configured to periodically determine the variance between the actual step position of the EEIV and an expected step position, and then determines a trend in the variance over a predetermined period (e.g., trend of the variance determinations over the previous X minutes/hours, etc.). The climate controller can then determine that working fluid is leaking at 1024 when the trend of the variance in the step position of the EEIV exceeds the predetermined limit. In some embodiments, the trend in variance can be useful for determining whether the heat transfer circuit is undercharged or is leaking. In some embodiments, the climate controller is configured to use an average of the variation or a time average of the detected temperature(s), pressure(s), etc.

In an embodiment, detecting whether the working fluid is leaking at 1020 may utilize different types of working fluid/refrigerant leak detection. For example, the climate controller may utilize a refrigerant detector (not shown) to detect if there is refrigerant in the climate controlled space and/or the internal space of the CCU (e.g., the internal space of the condenser unit, the internal space of the evaporator unit, etc.). The method 1000 then proceeds to 1030. At 1030, when leaking of the working fluid from the climate control circuit is detected, the method 1000 proceeds to 1040. When leaking of the working fluid from the climate control circuit is detected, the method 1000 returns to 1010. For example, the climate controller at 1010 continues the climate control circuit's conditioning of the climate controlled space when no working fluid leakage is detected. At 1040, the climate controller isolates the high-pressure side of the climate control circuit (e.g., high-pressure side 170, high-pressure side 270) when its detected that the working fluid is leaking. Isolating the high-pressure side can include shutting down the compressor at 1042 and closing the EEIV at 1044. For example, the isolation of the high-pressure side at 1040 can prevent the working fluid in the high-pressure side from flowing into the low-pressure side of the climate control circuit (e.g., low-pressure side 172, etc.). In an embodiment, the shutdown of the compressor at 1042 can occur prior to the closing of the EEIV at 1044 (e.g., prior to the EEIV reaching its closed position). The method 1000 then proceeds to 1050. The method 1000 then proceeds to optional 1050.

At 1050, the climate controller determines a location of a leak in the climate control circuit. The climate control circuit can include an electronic check valve (e.g., electronic check valve 160) with a proximity sensor (e.g., proximity sensor 162). In an embodiment, determining a location of a leak in the climate control circuit 1050 can include detecting, via the proximity sensor 162, the valve position of the electronic check valve 1052. The valve position of the electronic check valve (e.g., open or closed) can indicate the location of the leak in the climate control circuit as discussed above with respect electronic check valve 160 in the FIG. 2. The method the proceeds to optional 1060.

At 1060, the climate controller issues a warning that there is a working fluid leak. The warning may include the location of a leak as determined at 1050. In an embodiment, issuing the warning 1060 can include an HMI (e.g., HMI 190) connected to the climate controller displaying the warning to warn an operator of the climate controlled transport unit (e.g., climate controlled transport unit 1). In an embodiment, issuing the warning 1060 can include a telematics unit (e.g., telematics unit 192) connected to the climate controller wirelessly sending the warning to a remote device (e.g., a computer, a server, a server network, etc.).

In some embodiments, the method 1000 can include the climate controller maintaining the isolation at 1040 until receiving instructions that the leakage is repaired. For example, the climate controller can be configured to prevent a startup of the compressor until instructed that the leak is repaired. An operator and/or technician may instruct the climate controller that the leak is repaired via, for example, a HMI (e.g., HMI 190) and/or a telematics unit (e.g., telematics unit 192) connected to the TCCS. In such embodiments, the method 1000 would stay at 1040, 1050, or 1060 until receiving said instructions. After receiving instructions that the leakage has been repaired, method 1000 can proceed back to 1010 from 1040, 1050, or 1060. For example, the climate controller can be configured to resume climate conditioning (e.g., startup the compressor, open the EEIV) once it receives instructions that the leak has been repaired.

Figure 5:
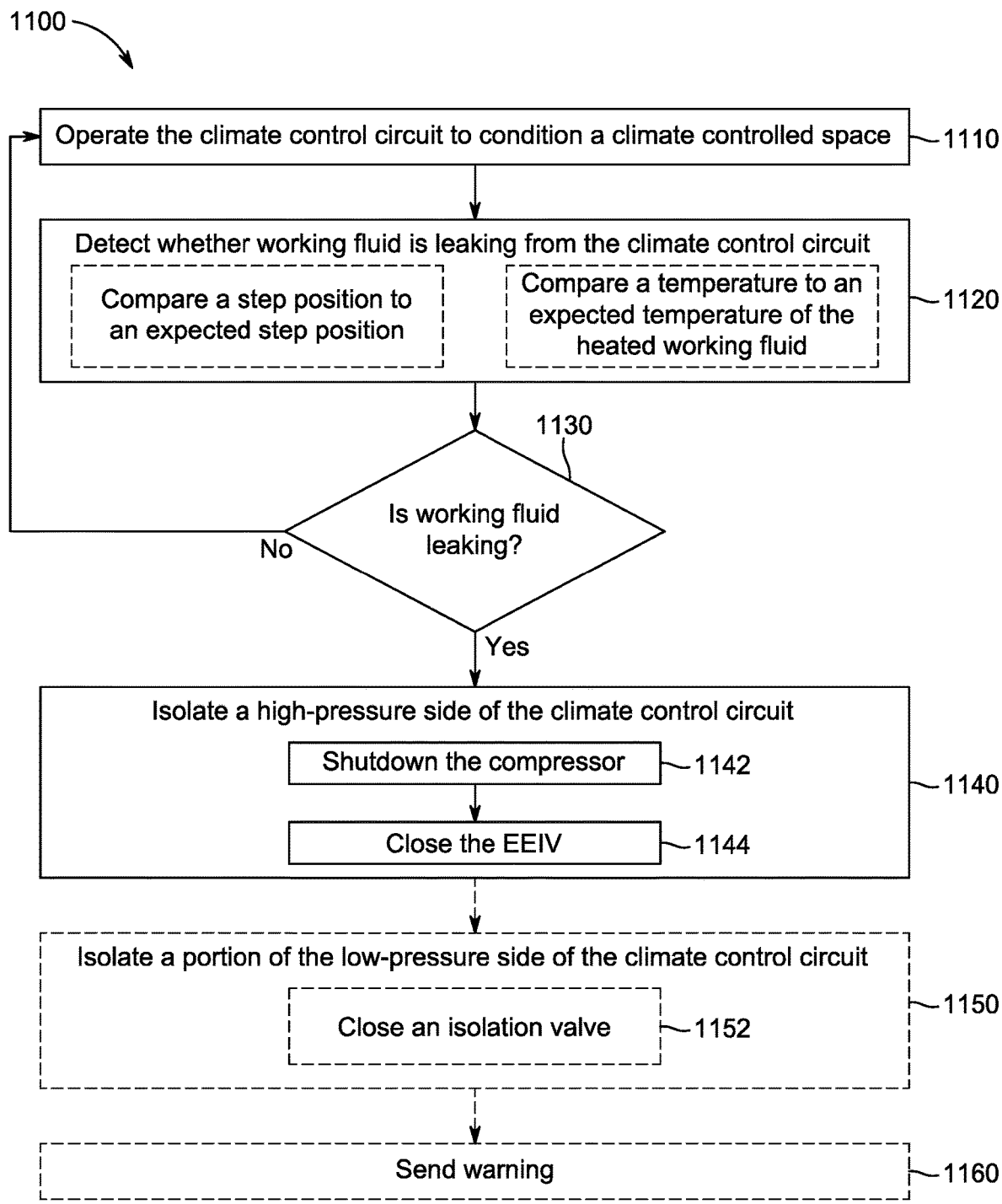
FIG. 5 is a flow chart of a method of controlling a transport climate control system, according to another embodiment.

FIG. 5 is a flow chart for a method 1100 of controlling a transport climate control system (TCCS) that includes a climate control circuit, according to another embodiment. In an embodiment, the method 1110 may be employed by the TCCS 20 in FIG. 1 and as described above. In an embodiment, the method 1100 may be employed by the climate controller 280 in FIG. 2 to control a TCCS that includes the CCU 200 in FIG. 3 and as described above. The method 1100 starts at 1110.

The method 1100 is similar to the method 1000 in FIG. 4, except for 1150. For example, the method 1100 includes operating a climate controlled space to condition a climate controlled space at 1110, determining whether the working fluid is leaking from the climate control circuit at 1120, returning to 1110 or proceeding to 1140 based on whether the working fluid is leaking, isolating a high-pressure side of the climate control circuit at 1140, and sending a warning at 1160, similar to the method 1000 in FIG. 4. After isolating a high-pressure side of the climate control at 1140, the method 1100 can proceed from 1140 to optional 1150.

At 1150, the climate controller (e.g., climate controller 280) isolates a portion of the low-pressure side (e.g., portion 272A of low-pressure side 272) of the climate control circuit (e.g., climate control circuit 230). Isolating the portion of the low-pressure side of the climate control circuit 1150 can include closing an isolation valve 1152 (e.g., isolation valve 260) in the climate control circuit. The isolation valve is located in the low-pressure side of the climate control circuit. For example, the isolation valve is located downstream of the evaporator (e.g., evaporator 250) and upstream of the compressor (e.g., compressor 232) in the climate control circuit. In FIG. 5, isolating the portion of the low-pressure side 1150 occurs after closing the EEIV 1142 in 1140. In an embodiment, isolating the portion of the low-pressure side 1150 may occur before or simultaneously with the closing of the EEIV 1142 and after the shutdown of the compressor 1142. The method 1100 then proceeds to optional 1160.

At 1160, the climate controller issues a warning that there is a working fluid leak. In an embodiment, issuing the warning 1160 includes an HMI (e.g., HMI 290) connected to the climate controller displaying the warning for warning an operator of the climate controlled transport unit (e.g., climate controlled transport unit 1). In an embodiment, issuing the warning 1160 includes a telematics unit (e.g., telematics unit 292) connected to the climate control wirelessly transmitting the warning to a remote device (e.g., a computer, a server, a server network, etc.).

In some embodiments, the method 1100 can include the climate controller maintaining the isolation at 1140 and 1150 until receiving instructions that the leakage is repaired. For example, the climate controller can be configured to prevent a startup of the compressor until instructed that the leak is repaired. An operator and/or technician may instruct the climate controller that the leak is repaired via, for example, a HMI (e.g., HMI 190) and/or a telematics unit (e.g., telematics unit 192) connected to the TCCS. In such embodiments, the method 1100 would stay at 1150 or 1160 until receiving said instructions. After receiving instructions that the leakage has been repaired, method 1100 can proceed back to 1110 from 1150 or 1160. For example, the climate controller can be configured to resume climate conditioning (e.g., startup the compressor, open the EEIV, open the isolation valve, etc.) once it receives instructions that the leak has been repaired.

Figure 6:
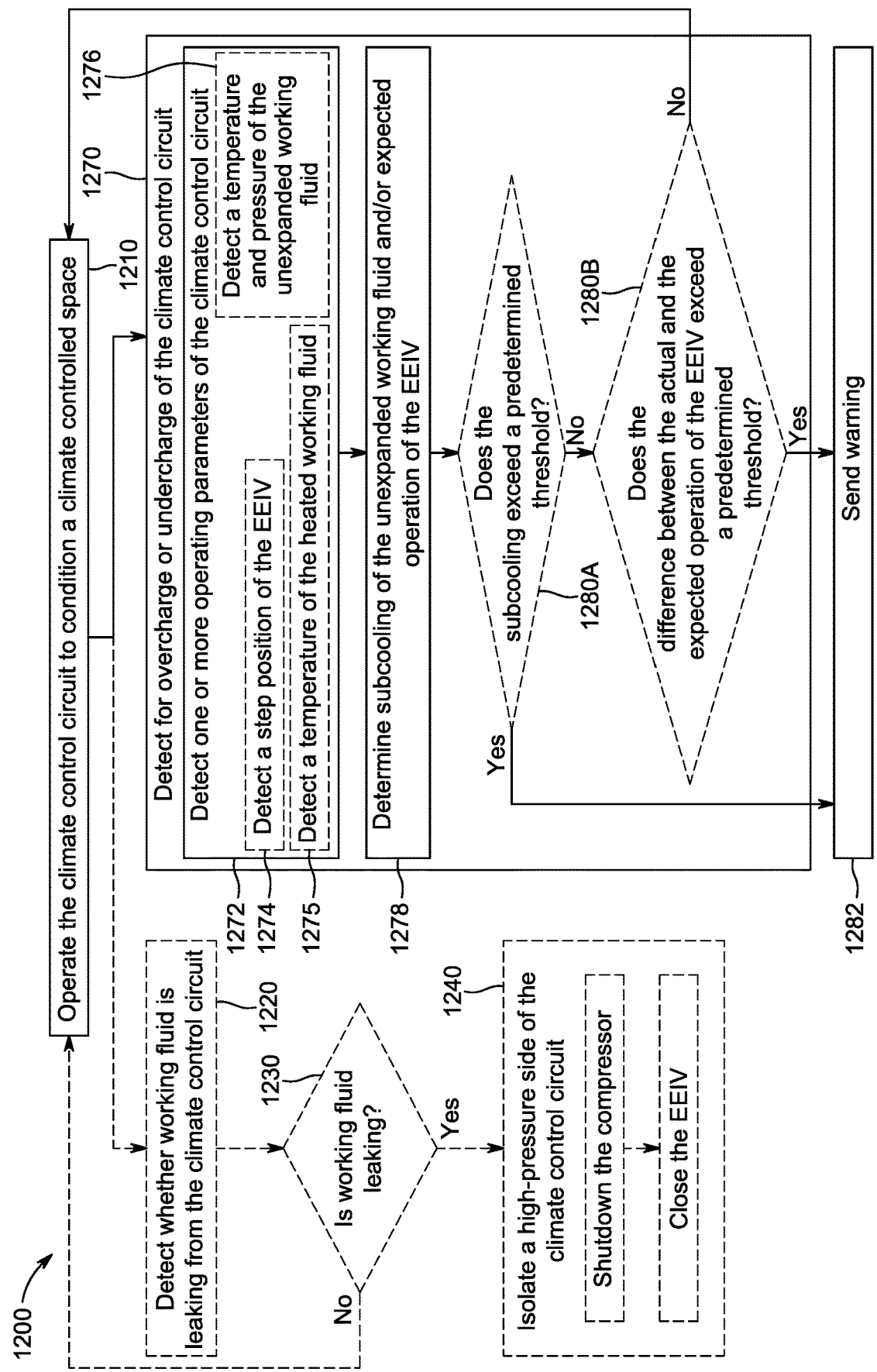
FIG. 6 is a flow chart of a method of controlling a transport climate control system, according to yet another embodiment.

FIG. 6 is a flow chart for a method 1200 of controlling a transport climate control system (TCCS) that includes a climate control circuit, according to yet another embodiment. In an embodiment, the method 1200 may be employed by the TCCS 20 in FIG. 1 and as described above. In an embodiment, the method 1200 may be employed to control a TCCS that includes the CCU 100 in FIG. 2 and as described above or to control a TCCS that includes the CCU 200 in FIG. 3 and as described above. The method 1200 starts at 1210.

At 1210, a climate control circuit (e.g., climate control circuit 130, climate control circuit 230) is operated to condition a climate controlled space (e.g., climate controlled space 12, climate controlled space 102, climate controlled space 202). In an embodiment, the climate controlled space is the climate controlled space of a transport unit (e.g., climate controlled space 12 of transport unit 10 in FIG. 1, etc.). The climate control circuit includes a compressor (e.g., compressor 132, the compressor 232), a condenser (e.g., condenser 134, condenser 234), an EEIV (e.g., EEIV 140, EEIV 240), and an evaporator (e.g., evaporator 150, evaporator 250). The compressor compresses the working fluid, the condenser cools the working fluid, the EEIV expands the working fluid, and the evaporator heats the working fluid. For example, the climate controlled circuit operates in a cooling mode to supply conditioned air (e.g., cooled air) to the climate controlled space. The method 1200 then proceeds to 1270 and optionally proceeds to optional 1220.

The method 1200 includes detecting whether working fluid is leaking from the climate control circuit at 1220, which proceeds to determining whether the working fluid is leaking at 1230, which proceeds to returning back to 1210 or to isolating a high-pressure side of the climate control circuit at 1240. 1220, 1230, and 1240 in FIG. 6 are similar to 1020, 1030, and 1040 described in FIG. 4. In an embodiment, 1220, 1230, and 1240 in the method 1200 have features similar to 1020, 1030, and 1040 of the method 1000, respectively, as described above.

In an embodiment, the method 1200 may include determining a location of a leak in the climate control leak at 1050 and/or sending a warning at 1060 similar to the method 1050 of the method 1000 as shown in FIG. 4 and as described above. In an embodiment, the method 1200 may include isolating a portion of the low-pressure side of the climate control circuit at 1150 and/or sending a warning at 1160 of the method 1100 as shown in FIG. 5 and as described above. In some embodiments, the method 1200 can include the climate controller maintaining the isolation at 1240 until receiving instructions that the leakage as similarly discussed above for the method 1000 or as similarly discussed above for the method 1100.

At 1270, the climate control controller monitors for an overcharge or an undercharge of the climate control circuit. Monitoring for an overcharge or undercharge of the climate control circuit can include performing 1272, 1276, 1278, 1280 and 1282. At 1272, the climate controller detects one or more operating parameters of the climate control circuit. Detecting the one or more parameters 1272 can include detecting a valve position of the EEIV 1274, detecting the temperature (e.g., temperature $T_1$, etc.) of the working fluid heated by the evaporator 1275, and/or detecting a temperature (e.g., temperature $T_2$, etc.) and pressure (e.g., pressure $P_2$, etc.) of the unexpanded working fluid 1276.

Detecting the valve position of the EEIV at 1274 can include the climate controller detecting, via a step position sensor (e.g., step position sensor 182), a step position of the stepper motor (e.g., stepper motor 144, stepper motor 244) of the EEIV. Detecting the temperature of the working fluid heated by the evaporator at 1275 can include the climate controller detecting, via a temperature sensor (e.g., temperature sensor 184), the temperature of the working fluid after being heated by the evaporator.

Detecting the temperature of the unexpanded working fluid at 1276 can include the climate controller detecting, via a temperature sensor (e.g., temperature sensor 186), the temperature of the unexpanded working fluid. In an embodiment, climate controller detects the temperature of the unexpanded working fluid within the EEIV.

Detecting the pressure of the unexpanded working fluid at 1276 can include the climate controller detecting, via a pressure sensor (e.g., pressure sensor 189), the pressure of the unexpanded working fluid. In an embodiment, detecting the temperature of the unexpanded working fluid may include the climate controller indirectly detecting the pressure of the unexpanded working fluid (e.g., based on current speed of the compressor, based on current electrical power being provided to an electric motor for the compressor, etc.). The method 1200 then proceeds to 1278.

At 1278, the climate controller determines a subcooling of the working fluid and/or expected operation of the EEIV. The subcooling at 1278 is the subcooling of the unexpanded working fluid (e.g., the compressed working fluid prior to being expanded by the EEIV) as similarly discussed above. The subcooling of the unexpanded working fluid can be used to determining if the climate control circuit is overcharged. For example, subcooling is the difference between the saturation temperature ("$T_{SAT}$") and the actual temperature $T_2$ of the unexpanded working fluid (e.g., subcooling=$T_{SAT}$–$T_2$). The climate controller 180 can determine the subcooling of the unexpanded working fluid based on the pressure $P_2$ and the temperature $T_2$ of the unexpanded working fluid. The method 1200 then proceeds to 1280.

In an embodiment, determining the expected operation of the EEIV at 1278 can include determining an expected step position of the EEIV. For example, the climate controller can determine the expected step position in a similar manner as discussed above for the method 1000. In another embodiment, determining the expected operation of the EEIV at 1278 can include an expected temperature of the working fluid after being heated by the evaporator. For example, the climate controller can determine the expected temperature of the heated working fluid in a similar manner as discussed above for the method 1000

At 1280A, the determined subcooling is compared to a predetermined threshold. The climate controller 180 can determine that the climate control circuit 130 is overcharged when the subcooling is greater than a predetermined threshold. When the subcooling does not exceed the predetermined threshold (e.g., the subcooling is equal to or less than the threshold), the method 1200 proceeds to 1280B. When the subcooling exceeds the predetermined threshold, the method 1200 proceeds to 1282.

At 1280B, the expected operation of the EEIV is compared to the actual operation of the EEIV. In an embodiment, the climate controller can compare the expected step position of the EEIV to the actual step position of the EEIV (e.g., step position POS). In another embodiment, the climate controller can compare the expected temperature of the working fluid heated by the evaporator to the detected temperature of the working fluid heated by the evaporator (e.g., temperature $T_1$). When the difference between the expected operation of the EEIV and the actual operation of the EEIV does not exceed a predetermined threshold (e.g., temperature amount, step amount, etc.), the method 1200 returns to 1210. When the difference between the expected operation of the EEIV and the actual operation of the EEIV does exceed the predetermined threshold, the method 1200 proceeds to 1282. At 1282, the climate controller issues a warning that the climate control circuit is overcharged or overcharged. In an embodiment, issuing the warning at 1280 includes a HMI (e.g., HMI 190, HMI 290) connected to the climate controller displaying the warning to an operator of the climate controlled transport unit (e.g., climate controlled transport unit 1). In an embodiment, issuing the warning 1280 includes a telematics unit (e.g., telematics unit 192, telematics unit 292) connected to the climate controller wirelessly communicating the warming to a remote device (e.g., a computer, a server, a server network, etc.).

The method 1200 in FIG. 6 has 1280A and 1280B as being subsequent steps. However, 1280A and 1280B may occur in a different order. In an embodiment, the order of 1280A and 1280B may be switched in the method 1200. In another embodiment, 1280A and 1280B may occur in parallel in the method 1200. FIG. 6 shows the method 1200 including both detecting for overcharge and undercharge of the climate control circuit. However, the method 1200 in some embodiments may include just one of detecting for an overcharge or detecting for an undercharge of the climate control circuit. In such an embodiment, the method 1200 can include just one of 1280A or 1280B.

In some embodiments, detecting for an overcharge or undercharge of the climate control circuit at 1270 may be combined with detecting whether working fluid is leaking fluid from the climate control circuit at 1220. For example, detecting whether the working fluid is leaking from the climate control circuit at 1220 can include detecting a valve position of the EEIV (e.g., for comparing the step position of the EEIV to an expected step position at 1022 in the method 1000, for comparing the temperature of the working fluid heated by the evaporator to an expected temperature of said working fluid at 1024 in the method 1000). The climate controller can be configured to detect a valve position of the EEIV, and the detected valve positon may be used in both detecting whether working fluid is leaking from the climate control circuit at 1220 (e.g., for comparing the step position to, for comparing temperature of the heated working fluid, etc.) and in detecting for overcharging of the climate control circuit at 1270 (e.g., in determining a subcooling of the EEIV at 1278). In an embodiment, the climate controller may be configured to shutdown the climate control circuit (e.g., shutdown the compressor, etc.) when it determines that there is an overcharge of the climate control circuit at 1280B. For example, method 1200 may include shutting down the climate control circuit between 1280B and 1282, or after sending the warning at 1282.

Aspects:

Any of aspects 1-10 can be combined with any of aspects 11-20, and any of aspects 11-13 can be combined with aspects 14-20.

Aspect 1. A method of controlling a transport climate control system (TCCS) for a transport unit, the TCCS including a climate control circuit with a compressor and an electronic expansion and isolation valve (EEIV), the method comprising:
    operating the climate control circuit to condition a climate controlled space of the transport unit, wherein operating the climate control circuit to condition the climate controlled space includes compressing a working fluid with the compressor and expanding the working fluid with the EEIV;
    detecting for leaking of the working fluid from the climate control circuit; and
    isolating a high-pressure side of the climate control circuit when detected that the working fluid is leaking from the climate control circuit.

Aspect 2. The method of aspect 1, wherein the high-pressure side of the climate control circuit is isolated from the low-pressure side of the climate control circuit.

Aspect 3. The method of either one of aspects 1 or 2, wherein isolating the high-pressure side of the climate control circuit includes closing the EEIV and shutting down the compressor.

Aspect 4. The method of any one of aspects 1-3, further comprising:
    isolating a portion of a low-pressure side of the climate control circuit when detected that the working fluid is leaking from the climate control circuit.

Aspect 5. The method of aspect 4, wherein the climate control circuit includes an evaporator to heat the working fluid, the portion of the low-pressure side extending through an evaporator unit containing the evaporator.

Aspect 6. The method of either one aspects 4 or 5, wherein isolating the portion of the low-pressure side of the climate control circuit includes closing an isolation valve downstream of the evaporator and upstream of the compressor in the climate control circuit.

Aspect 7. The method of any one of aspect 1-6, wherein
    expanding the working fluid in the EEIV includes a stepper motor adjusting the EEIV based on a superheat of the working fluid, and
    detecting for leaking of the working fluid from the climate control circuit includes:
        detecting at least one step position of the EEIV and one or more other operational parameters of the climate control circuit, and
        comparing operation of the EEIV to an expected operation of the EEIV, the expected operation of the EEIV being operation of the EEIV expected from the detected at least one step position of the EEIV and the detected one or more other operational parameters of the climate control circuit.

Aspect 8. The method of any one of aspects 1-7, further comprising:
    detecting for overcharge of the climate control circuit, wherein detecting for the overcharge of the climate control circuit includes:
        detecting a temperature and a pressure of the working fluid compressed by compressor,
        determining a subcooling of the working fluid compressed by the compressor based on the temperature and the pressure of the working fluid compressed by the compressor, and
        detecting that the climate controlled circuit is overcharged when the subcooling is greater than a predetermined threshold.

Aspect 9. The method of aspect 8, wherein the EEIV includes a temperature sensor positioned on a low-pressure side of the EEIV, the detected temperature of the working fluid expanded by the EEIV being detected via the temperature sensor of the EEIV.

Aspect 10. The method of any one of aspects 1-3 and 7-9, further comprising:
    determining a location of a leak in the climate control circuit when detected that the working fluid is leaking from the climate control circuit, wherein determining a location of the leak in the climate control circuit includes:
        detecting a valve position of an electronic check valve, the electronic check valve being downstream of the evaporator and upstream of the compressor in the climate control circuit, and
        determining a location of the leak in the climate control circuit based on the detected valve position of the electronic check valve.

Aspect 11. A method of controlling a transport climate control system (TCCS) for a transport unit, the TCCS including a climate control circuit with a compressor to compress a working fluid and an electronic expansion and isolation valve (EEIV) to expand the working fluid, the method comprising:
    operating the climate control circuit to condition a climate controlled space;
    detecting for at least one of overcharge and undercharge of the climate control circuit, wherein detecting for overcharge of the climate controlled circuit includes:
        detecting a temperature and a pressure of the compressed working fluid, and
        determining a subcooling of the compressed working fluid based on the temperature and the pressure of the compressed working fluid,
    wherein detecting for an undercharge includes:
        detecting a step position of the EEIV, and
        determining an expected operation of the EEIV based on a step position of the EEIV; and
    sending a warning when determined that the climate controlled circuit is at least one of overcharged or undercharged.

Aspect 12. The method of aspect 11, wherein the EEIV includes a temperature sensor, and the detected temperature of the working fluid after being compressed by the EEIV being detected via the temperature sensor of the EEIV.

Aspect 13. A transport climate control system (TCCS) for a transport unit, comprising:
    a climate control circuit including:
        a compressor to compress a working fluid,
        a condenser to cool the working fluid compressed by the compressor,
        an electronic expansion and isolation valve (EEIV) to expand the working fluid condensed by the condenser, and
        an evaporator to heat the working fluid expanded by the EEIV; and
    a climate controller configured to:
        detect for the working fluid leaking from the climate control circuit, and
        isolate a high-pressure side of the climate control circuit when determined that the working fluid is leaking from the climate control circuit.

Aspect 14. The TCCS of aspect 13, wherein the climate controller is configured to close the EEIV and shutdown the compressor, in order to isolate the high-pressure side of the climate control circuit.

Aspect 15. The TCCS of any one of aspects 13 and 14, wherein the EEIV includes a stepper motor and a step position sensor for detecting a step position of the stepper motor, and the climate controller is configured to:
detect, via the step position sensor, at least one step position of the stepper motor,
detect one or more other operational parameters of the climate control circuit, and
comparing operation of the EEIV to an expected operation of the EEIV, the expected operation of the EEIV being operation of the EEIV expected from the detected at least one step position and the detected one or more other operational parameters of the climate control circuit.

Aspect 16. The TCCS of any one of aspects 13-15, wherein
the climate controller is configured to:
detect a valve position of the EEIV and a temperature of the working fluid expanded by the EEIV,
determine an expected temperature of the working fluid expanded by the EEIV based on the detected valve position of the EEIV,
determine a subcooling of the EEIV by comparing the expected temperature of the working fluid expanded by the EEIV to the detected temperature of the working fluid expanded by the EEIV,
determine that the climate control circuit is overcharged when the subcooling is greater than a predetermined threshold.

Aspect 17. The TCCS of any one of aspects 13-16, wherein
the climate control circuit includes an isolation valve downstream of the evaporator and upstream of the compressor, and
the climate controller is configured to isolate a portion of a low-pressure side of the compressor by closing the isolation valve when detected that the working fluid is leaking from the climate control circuit.

Aspect 18. The TCCS of aspect 17, further comprising:
a climate control unit including an evaporator unit and a condenser unit, the evaporator unit including the evaporator, and the condenser unit including the condenser, wherein
the portion of the low-pressure side extends through the evaporator unit.

Aspect 19. The TTCS of any one of aspects 13-16, wherein
the climate control circuit includes an electronic check valve with a proximity sensor, and
the climate controller configured to:
detect, via the proximity sensor, a valve position of the electronic check valve, and
determine a location of a leak in the climate control circuit based on the detected valve position of the electronic check valve.

The examples disclosed in this application are to be considered in all respects as illustrative and not limitative. The scope of the invention is indicated by the appended claims rather than by the foregoing description; and all changes which come within the meaning and range of this application.

What is claimed is:

1. A method of controlling a transport climate control system (TCCS) for a transport unit, the TCCS including a climate control circuit with a compressor and an electronic expansion and isolation valve (EEIV), the method comprising:
operating the climate control circuit to condition a climate controlled space of the transport unit, wherein operating the climate control circuit to condition the climate controlled space includes compressing a working fluid with the compressor and expanding the working fluid with the EEIV, wherein expanding the working fluid in the EEIV includes a stepper motor adjusting the EEIV based on a superheat of the working fluid;
detecting for leaking of the working fluid from the climate control circuit, which includes:
detecting, with a step position sensor, one or more step positions of the stepper motor of the EEIV, and
comparing operation of the EEIV to an expected operation of the EEIV, one of the operation of the EEIV and the expected operation of the EEIV being based on the detected one or more step positions of the stepper motor; and
closing the EEIV and shutting down the compressor to isolate a high-pressure side of the climate control circuit when it is detected that the working fluid is leaking from the climate control circuit, wherein the compressor is configured to block flow of the working fluid through the compressor when shutdown.

2. The method of claim 1, wherein
detecting for leaking of the working fluid from the climate control circuit includes detecting an operational parameter of the climate control circuit, and
a different one of the operation of the EEIV and the expected operation of the EEIV is based on the detected operational parameter.

3. The method of claim 1, wherein
the stepper motor adjusting the EEIV based on the superheat of the working fluid includes a first step adjustment between two step positions of the one or more step positions,
detecting for leaking of the working fluid from the climate control circuit includes detecting a temperature change of the working fluid caused by the first step adjustment, and
comparing operation of the EEIV to the expected operation of the EEIV includes comparing the temperature change of the working fluid caused by the first step adjustment to an expected temperature change for the first step adjustment.

4. The method of claim 3, wherein
the first step adjustment between two step positions is moving from a first step position of the one or more step positions to a second step position of the one or more step positions,
the temperature change of the working fluid is a difference between a first temperature of the working fluid that corresponds with the first step position and a second temperature of the working fluid that corresponds with the second step position, and
the operational parameter of the climate control circuit includes the first temperature of the working fluid and the second temperature of the working fluid.

5. The method of claim 1, wherein the expected operation of the EEIV is an expected temperature of the working fluid based on the detected one or more step positions.

6. The method of claim 5, wherein the expected temperature of the working fluid is an expected temperature change of the working fluid based on two or more of the detected one or more step positions.

7. The method of claim 1, wherein the high-pressure side of the climate control circuit is isolated from a low-pressure side of the climate control circuit.

8. The method of claim 1, further comprising:
isolating a portion of a low-pressure side of the climate control circuit when detected that the working fluid is leaking from the climate control circuit.

9. The method of claim 8, wherein the climate control circuit includes an evaporator to heat the working fluid, the portion of the low-pressure side extending through an evaporator unit containing the evaporator.

10. The method of claim 8, wherein the climate control circuit includes an evaporator to heat the working fluid, and isolating the portion of the low-pressure side of the climate control circuit includes closing an isolation valve downstream of the evaporator and upstream of the compressor in the climate control circuit.

11. A transport climate control system (TCCS) for a transport unit, comprising:
a climate control circuit including:
a compressor to compress a working fluid, the compressor is configured to block flow of the working fluid through the compressor when shutdown,
a condenser to cool the working fluid compressed by the compressor,
an electronic expansion and isolation valve (EEIV) to expand the working fluid condensed by the condenser, the EEIV includes a stepper motor and a step position sensor for detecting a step position of the stepper motor, and
an evaporator to heat the working fluid expanded by the EEIV; and
a climate controller configured to:
adjust, with the stepper motor, the EEIV based on a superheat of the working fluid,
detect for the working fluid leaking from the climate control circuit, which includes:
detecting, via the step position sensor, one or more step positions of the stepper motor of the EEIV,
comparing operation of the EEIV to an expected operation of the EEIV, one of the operation of the EEIV and the expected operation of the EEIV being based on the detected one or more step positions of the stepper motor, and
close the EEIV and shut down the compressor that isolates a high-pressure side of the climate control circuit when it is determined that the working fluid is leaking from the climate control circuit.

12. The TCCS of claim 11, wherein
the climate controller being configured to detect for the working fluid leaking from the climate control circuit includes detecting an operational parameter of the climate control circuit, and
a different one of the operation of the EEIV and the expected operation of the EEIV is based on the detected operational parameter.

13. The TCCS of claim 11, wherein
adjusting, with the stepper motor, the EEIV based on the superheat of the working fluid includes a first step adjustment between two step positions of the one or more step positions,
the climate controller being configured to detect, via a temperature sensor, a temperature change of the working fluid caused by the first step adjustment, and
comparing operation of the EEIV to the expected operation of the EEIV includes comparing the temperature change of the working fluid caused by the first step adjustment to an expected temperature change for the first step adjustment.

14. The TCCS of claim 13, wherein
the first step adjustment between two step positions is moving from a first step position of the one or more step positions to a second step position of the one or more step positions, and
the temperature change of the working fluid is difference between a first temperature of the working fluid that corresponds with the first step position and a second temperature of the working fluid that corresponds with the second step position.

15. The TCCS of claim 11, wherein the expected operation of the EEIV is an expected temperature of the working fluid based on the detected one or more step positions.

16. The TCCS of claim 15, wherein the expected temperature of the working fluid is an expected temperature change of the working fluid based on two or more of the detected one or more step positions.

17. The TCCS of claim 11, wherein
the climate control circuit includes an isolation valve downstream of the evaporator and upstream of the compressor, and
the climate controller is configured to isolate a portion of a low-pressure side of the compressor by closing the isolation valve when detected that the working fluid is leaking from the climate control circuit.

18. The TCCS of claim 17, further comprising:
a climate control unit including an evaporator unit and a condenser unit, the evaporator unit including the evaporator, and the condenser unit including the condenser, wherein
the portion of the low-pressure side extends through the evaporator unit.

* * * * *